(12) United States Patent  
Shamlin et al.

(10) Patent No.: US 9,128,991 B2  
(45) Date of Patent: Sep. 8, 2015

(54) TECHNIQUES TO PERFORM IN-DATABASE COMPUTATIONAL PROGRAMMING

(71) Applicants: David B. Shamlin, Durham, NC (US); Michael S. Whitcher, Apex, NC (US)

(72) Inventors: David B. Shamlin, Durham, NC (US); Michael S. Whitcher, Apex, NC (US)

(73) Assignee: SAS INSTITUTE, INC., Cary, NC (US)

( * ) Notice: Subject to any disclaimer, the term of this patent is extended or adjusted under 35 U.S.C. 154(b) by 0 days.

(21) Appl. No.: 14/196,631

(22) Filed: Mar. 4, 2014

(65) Prior Publication Data

US 2014/0188918 A1    Jul. 3, 2014

Related U.S. Application Data

(63) Continuation-in-part of application No. 13/438,724, filed on Apr. 3, 2012, now Pat. No. 8,682,876.

(51) Int. Cl.  
*G06F 17/30*    (2006.01)

(52) U.S. Cl.  
CPC .... *G06F 17/30545* (2013.01); *G06F 17/30539* (2013.01)

(58) Field of Classification Search  
USPC ............................. 707/2, 3; 711/165; 709/201  
See application file for complete search history.

(56) References Cited

U.S. PATENT DOCUMENTS

| 2012/0131591 A1* | 5/2012 | Moorthi et al. ............... 718/104 |
| 2012/0209901 A1* | 8/2012 | Xu et al. ....................... 709/201 |
| 2012/0278578 A1* | 11/2012 | Castillo et al. ............... 711/165 |

* cited by examiner

*Primary Examiner* — Etienne Leroux  
(74) *Attorney, Agent, or Firm* — Kacvinsky Daisak Bluni PLLC

(57) ABSTRACT

Various embodiments are generally directed to an apparatus and method for generating a general request having structures and information to perform an analytical calculation on data stored in a distributed database system and converting the structures and information of the general request to a compute request having a request format conforming to a query language used by the distributed database system. Various embodiments may also include sending the compute request to a node of the distributed database system and receiving a compute response from the node of the distributed database system, the compute response including a result set of the analytical calculation performed on data local to the node from an analytic container implemented by the node, the analytic container including an embedded process to replicate an execution environment hosted within the distributed database system used by a client application.

33 Claims, 24 Drawing Sheets

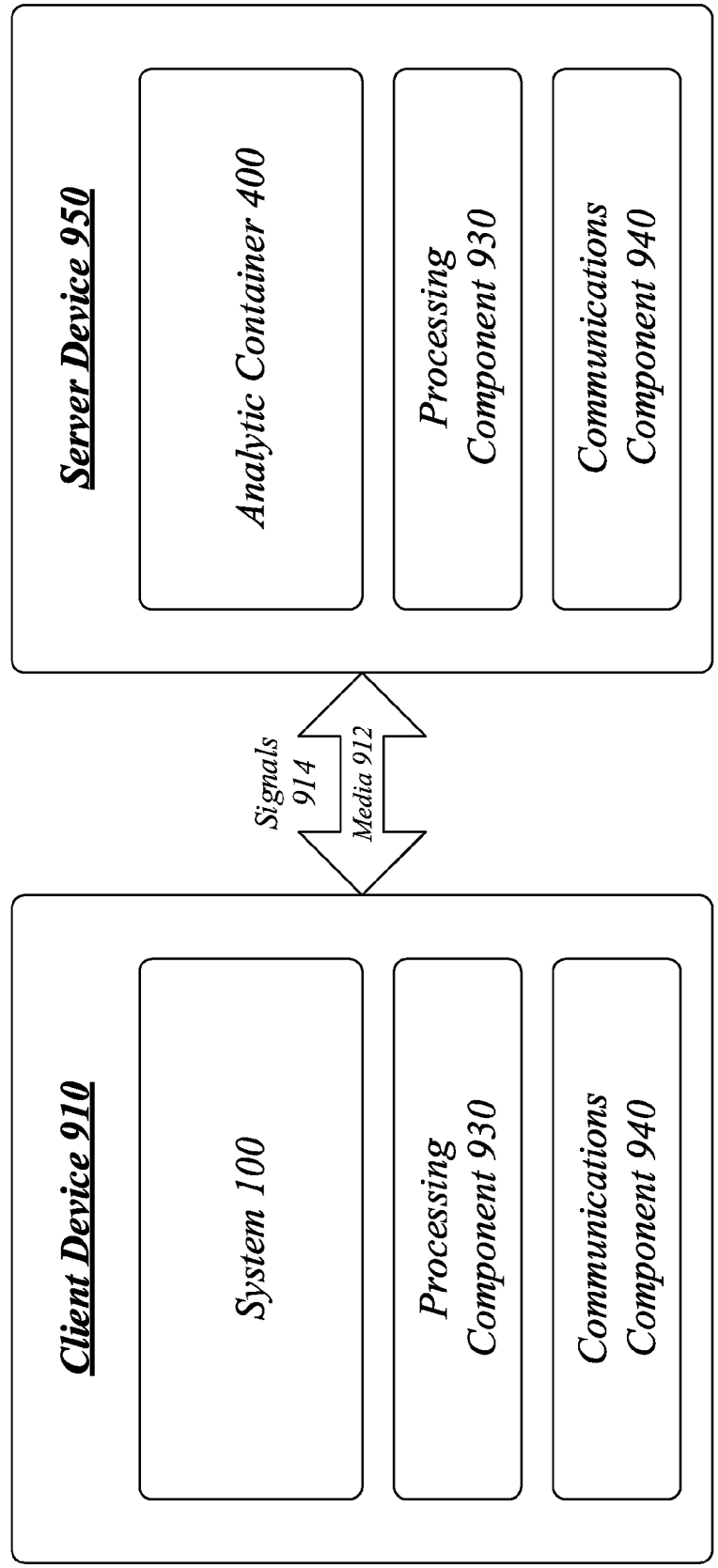

1000

GENERATE A GENERAL REQUEST TO PERFORM AN ANALYTICAL CALCULATION ON DATA STORED IN A DISTRIBUTED DATABASE SYSTEM COMPRISING A CONTROL NODE AND MULTIPLE WORKER NODES, THE GENERAL REQUEST GENERATED BY A CLIENT APPLICATION USING A THREADED KERNEL SERVICE LAYER
1002

CONVERT THE GENERAL REQUEST TO A COMPUTE REQUEST HAVING A REQUEST FORMAT USED BY THE DISTRIBUTED DATABASE SYSTEM
1004

SEND THE COMPUTE REQUEST TO A NODE OF THE DISTRIBUTED DATABASE SYSTEM
1006

RECEIVE A COMPUTE RESPONSE FROM THE NODE OF THE DISTRIBUTED DATABASE SYSTEM, THE COMPUTE RESPONSE INCLUDING A RESULT SET OF THE ANALYTICAL CALCULATION PERFORMED ON DATA LOCAL TO THE NODE FROM AN ANALYTIC CONTAINER IMPLEMENTED BY THE NODE
1008

RECEIVE A COMPUTE REQUEST TO PERFORM AN ANALYTICAL CALCULATION ON DATA STORED IN A DISTRIBUTED DATABASE SYSTEM COMPRISING A CONTROL NODE AND MULTIPLE WORKER NODES, THE COMPUTE REQUEST RECEIVED FROM A CLIENT APPLICATION USING A THREADED KERNEL SERVICE LAYER
*1402*

EXECUTE AN EMBEDDED PROCESS IN AN ANALYTIC CONTAINER ON A NODE OF THE DISTRIBUTED DATABASE SYSTEM, THE EMBEDDED PROCESS COMPRISING A THREADED KERNEL SERVICE LAYER MATCHING THE THREADED KERNEL SERVICE LAYER USED BY THE CLIENT APPLICATION
*1404*

EXECUTE AN EMBEDDED DATABASE PROGRAM BY THE EMBEDDED PROCESS ON THE NODE USING THE THREADED KERNEL SERVICE LAYER, THE EMBEDDED DATABASE PROGRAM ARRANGED TO PERFORM THE ANALYTICAL CALCULATION
*1406*

PERFORM THE ANALYTICAL CALCULATION ON A PARTITION OF DATA LOCAL TO THE NODE USING THE EMBEDDED DATABASE PROGRAM TO FORM A RESULT SET
*1408*

SEND A COMPUTE RESPONSE WITH THE RESULT SET TO THE CLIENT APPLICATION
*1410*

```
RETRIEVE INFORMATION FROM A DATABASE FILE SYSTEM
BASED ON A COMPUTE REQUEST
1902
            │
INSERT THE INFORMATION INTO INPUT ROWS FOR
PROCESSING
1904
            │
EXECUTE AN EMBEDDED PROCESS AND PROCESS THE
INFORMATION IN THE INPUT ROWS
1906
            │
POST-PROCESS THE INFORMATION AND GENERATE A
COMPUTE RESPONSE
1908
            │
SEND A COMPUTE RESPONSE
1910
```

```
GENERATE, BY A PROCESSOR CIRCUIT, A GENERAL
REQUEST HAVING STRUCTURES AND INFORMATION TO
PERFORM AN ANALYTICAL CALCULATION ON DATA STORED
IN A DISTRIBUTED DATABASE SYSTEM, THE GENERAL
REQUEST GENERATED BY A CLIENT APPLICATION
2002
```

```
CONVERT THE STRUCTURES AND INFORMATION OF THE
GENERAL REQUEST TO A COMPUTE REQUEST HAVING A
REQUEST FORMAT CONFORMING TO A QUERY LANGUAGE
USED BY THE DISTRIBUTED DATABASE SYSTEM
2004
```

```
SEND THE COMPUTE REQUEST TO A NODE OF THE
DISTRIBUTED DATABASE SYSTEM
2006
```

```
RECEIVE A COMPUTE RESPONSE FROM THE NODE OF THE
DISTRIBUTED DATABASE SYSTEM, THE COMPUTE RESPONSE
INCLUDING A RESULT SET OF THE ANALYTICAL
CALCULATION PERFORMED ON DATA LOCAL TO THE NODE
FROM AN ANALYTIC CONTAINER IMPLEMENTED BY THE
NODE, THE ANALYTIC CONTAINER INCLUDING AN
EMBEDDED PROCESS TO REPLICATE AN EXECUTION
ENVIRONMENT HOSTED WITHIN THE DISTRIBUTED
DATABASE SYSTEM USED BY THE CLIENT APPLICATION
2008
```

*FIG. 20*

TECHNIQUES TO PERFORM IN-DATABASE COMPUTATIONAL PROGRAMMING

RELATED APPLICATION

This application is a continuation in part of U.S. patent application Ser. No. 13/438,724, filed on Apr. 3, 2012 and claims priority to that date for all applicable subject matter.

BACKGROUND

When computation procedures are to be executed by a system that requires data stored in a database, such as a foreign database, the data is typically first read into a process space of the system before the system performs any requested computation(s). Though computation in a system has been continually improved to increase performance, the act of reading data (e.g., from foreign databases) into the system places a great overall time constraint in performing a requested operation.

When table sizes involved in computational programming become large, e.g., in the hundreds of millions or even billions of observations, the performance of data fetching, as measured in response time as well as needed disk (or memory) space to store the data, into an analysis session to execute a procedure may be very expensive or resource prohibitive. Moreover, in many instances, the computational results of the analysis procedure may be stored back into a table located on a foreign database. The act of writing the data back to the database can also be expensive when the results from the computation are large.

In conventional systems, to execute a procedure, the data is read from the database into an analysis session, where computation is performed, and results of the computation in many cases written back to the database from which the data was retrieved. This procedure is known as an "outside-the-database" model. To speed up the response time, many procedures have been architected to operate using multiple operating system (OS) threads, using symmetric multi-processing (SMP) techniques. However, the performance of SMP techniques does not eliminate or reduce the amount of data that must be transmitted across a network between a client application that performs the computation and the foreign database.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to perform in-database computational programming. In-database computational programming may refer to techniques for co-location of analytic code and data. Some embodiments are particularly directed to techniques to perform in-database computational programming for distributed database systems in which each compute node of a distributed database system executes analytic code designed for computation on a different partition of data for a given work request. The analytic code exercises full control of analytical processes and full control of data access for a given compute node, and uses data available to the compute node for data analysis. Furthermore, the analytic code may be portable and designed to execute on any distributed database system, or node of a distributed database system, without any changes needed for the analytic code. In this manner, the analytic code may be used with any distributed database system suitable for storing, manipulating and managing massive data sets.

In one embodiment, for example, an apparatus may comprise a processor circuit and a client application operative on the processor circuit to generate a general request to perform an analytical calculation on data stored in a distributed database system based on a compute model, where the client application uses a threaded kernel service layer. The apparatus may also comprise a compute request component operative on the processor circuit to convert the general request to a compute request having a request format used by the distributed database system, and send the compute request to a node of the distributed database system having an analytic container. Other embodiments are described and claimed.

In another embodiment an apparatus may include a processor circuit, a network interface coupled with the processor circuit and a client application operative on the processor circuit to generate a general request having structures and information to perform an analytical calculation on data stored in a distributed database system. The apparatus may also include a compute model component operative on the processor circuit to convert the structures and information of the general request to a compute request having a request format conforming to a query language used by the distributed database system and a compute request component operative on the processor circuit to send the compute request to a node of the distributed database system. In some embodiments, the apparatus may comprise a compute response component operative on the processor circuit to receive a compute response from the node of the distributed database system, the compute response including a result set of the analytical calculation performed on data local to the node from an analytic container implemented by the node, the analytic container including an embedded process to replicate an execution environment hosted within the distributed database system used by the client application.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 9 illustrates an embodiment of a distributed system for the system of FIG. 1A and FIG. 1B.

FIG. 10 illustrates an embodiment of a first logic flow.

FIG. 14 illustrates an embodiment of a fifth logic flow.

FIG. 19 illustrates an embodiment of a sixth logic flow.

FIG. 20 illustrate an embodiment of a seventh logic flow.

DETAILED DESCRIPTION

Figure 1A:
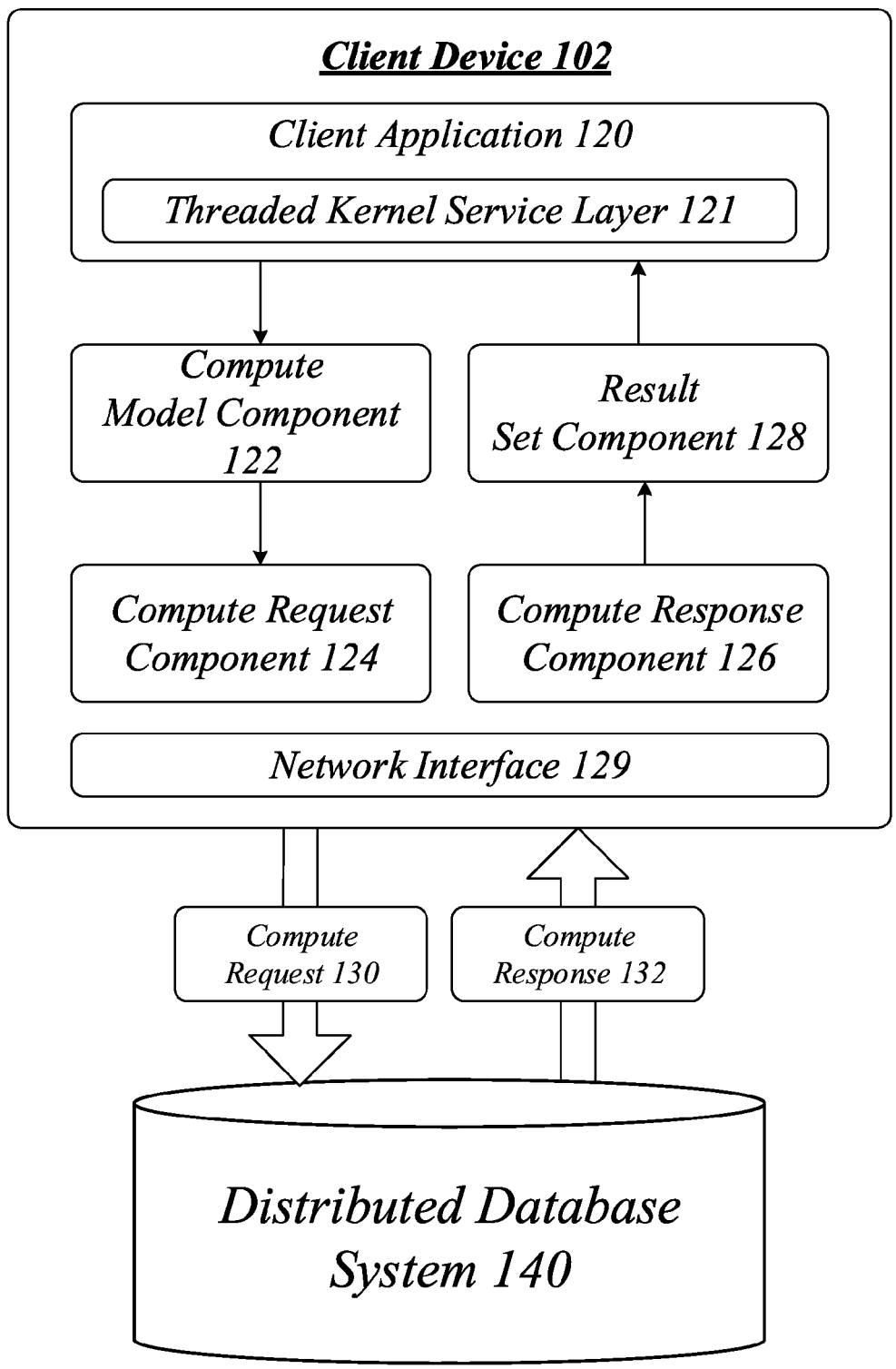
FIG. 1A illustrates an embodiment of a system to perform in-database computational programming.

Various embodiments are directed to performing computational programming and in particular to performing in-database analytical calculations on data stored in a distributed database system. Some embodiments may execute the analytic calculations across massive data sets in an efficient manner by performing massive parallel processing (MPP) across multiple databases.

In particular, embodiments may include techniques to provide a compute response to a compute request to perform an analytical calculation by a distributed database system. The compute request may originate from an application program outside of the distributed database system executed on a client device or on an application server in a cloud computing system. The compute response may include a result set of an analytical calculation performed on data that is local to a node of the distributed data system. The analytical calculation may be performed within an analytic container implemented by the node. The analytic container is specifically designed to provide a set of software services and components to allow execution of an embedded program within one or more nodes of the distributed database system in a machine-independent manner. The embedded program is designed to perform analytic calculations in a manner similar to the application program outside of the distributed database system, such as a statistical software program, among others. This distributed architecture allows the application program and embedded program to operate in accordance with an in-database model that is capable of working with a multiplicity of database systems. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates a block diagram for a system 100. Although the system 100 shown in FIG. 1A has a limited number of elements in a certain topology, it may be appreciated that the system 100 may include more or less elements in alternate topologies as desired for a given implementation. In various embodiments, the system 100 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

In various embodiments, the system 100 may be implemented by one or more electronic devices each having computing and/or communications capabilities. Example computing devices may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, components and/or modules of the system 100, and any electronic devices implementing some or all of the components and/or modules of the system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the system 100 may be implemented as part of a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced interactive form techniques, it may be appreciated that the enhanced interactive form techniques may be implemented by a single computing device as well. The embodiments are not limited in this context.

In various embodiments, the system 100 may be arranged to distribute a compute request 130 sent from a client application 120 to a distributed database system 140 in a manner that allows the nodes of a distributed database system 140 to perform the analytical calculation regardless of the format of the original compute request 130. In some embodiments, a client device 102 may include a processor circuit (not shown) and a client application 120 that is operative on the processor circuit to generate a general request to perform an analytical calculation on data stored in a distributed database system based on a compute model, where the client application 120 using a threaded kernel service layer 121. The client device 102 may also include a compute request component 124 that is operative on the processor circuit to convert the general request to a compute request 130 having a request format used by the distributed database system 140, where the compute request component 124 is also operative to send the compute request 130 to a node of the distributed database system 140 having an analytic container.

In particular, the system 100 may comprise a computer-implemented system 100 that includes client device 102. The client device 102 may include several components including the client application 120 and compute request component 124. In particular, the client application 120 may be generally arranged to perform analytical calculation based upon data stored in databases, such as in a distributed database system. The client application 120 may issue commands to manipulate and/or retrieve stored data, including issuing structured query language (SQL) commands (queries) to be forwarded to a node in a database where data is to be retrieved and manipulated.

The client application 120 may comprise any application program that generally allows a user to accomplish one or more specific tasks. In various implementations, the client application 120 may provide a graphical user interface (GUI) to communicate information between the client application 120 and a user via an output device, such as an electronic display. Examples of client applications 120 may include without limitation information technology (IT) management applications, human resource management applications, financial management applications, business intelligence applications, customer relationship management applications, report generating applications, statistical analysis applications, business planning applications, project management applications, productivity applications, word processing applications, spreadsheet applications, database applications, and so forth. In one embodiment, for example, the client application 120 may be implemented as one or more statistical computing programs, such as one or more SAS® software application programs made by SAS Institute Inc., Cary, N.C. The embodiments, however, are not limited to these examples.

As illustrated in FIG. 1A, the client application 120 may comprise a threaded kernel service layer 121. The threaded kernel service layer 121 may be generally arranged to provide an array of portable services, definitions, data formats, and drivers to support various analytical procedures and programming languages. One implementation of this layer may employ a fourth generation (4GL) programming language, such as a 4GL DS2 programming language, in which the DS2 programming language may include basic program execution units, or system methods, including: NIT, RUN, and TERM. In particular embodiments, using the threaded kernel service layer 121, a DS2 program can be written and deployed on each of multiple worker threads (e.g., stored in a database table, stored on the file system, submitted as a character constant program string in an SQL query).

As illustrated in FIG. 1A, the client device 102 may comprise a compute model component 122. The compute model component 122 may be generally arranged to construct an in-memory work request that is to be performed in a distributed database, such as distributed database 140. The in-memory work request may be initially generated as a general request and subsequently modified to a compute request 130, as detailed below. For example, the client application 120 of client device 102 may generate a general request to perform an analytical calculation, which is processed by the compute model component 122 to construct the in-memory work request to be performed by one or more nodes in the distributed database system 140, as detailed below with respect to FIG. 3.

The general request may be originally generated in a format native to the client application 120 before being processed by the compute model component 122. A basic layout of a database-specific request, such as a SQL request, may be modeled using a common (generic) set of structures to form a compute model. This allows a high percentage of the SQL to be portable, and extended as the SQL language definition is extended. The compute model may define, for example, SQL text substitution for variables, functions, and language semantics. The client application 120 may then generate a general request using the compute model, without causing re-writes of programming code when implementing the client application 120 with a new database system.

The client device 102 may also include a compute request component 124. The compute request component 124 may be generally arranged to translate the basic structures and pseudo information of a general request into a compute request 130. In general, a compute request 130 is a database-specific request for a given database that contains data to be processed. The database-specific request may subsequently be submitted as a query to the given database.

A compute request 130 may have a format suitable for a database system, such as the distributed database system 140. The format may conform to any query language suitable for a given database system. In one embodiment, for example, the format may comprise a programming language designed for managing data in a relational database management system, such as a SQL request. The SQL request may include SQL text with various structured information elements such as data insert, query, update and delete, schema creation and modification, data access control, and so forth. Other query languages and formats may be used other than SQL, including without limitation .QL, fourth dimension (4D) query language (4D QL), datalog, hypertext structured query language (HTSQL), IBM® business system 12, information systems base language (ISBL), java persistence query language (JPQL), JoSQL, object query language, query by example (QBE), quel, tutorial D, stack based query language (SBQL), unstructured query language (UnQL), extensible markup language (XML) query (XQuery), JavaScript® object notation (JSON) and so forth. The embodiments are not limited in this context.

In the illustration of FIG. 1A, the client device 102 may further include a compute response component 126. The compute response component 126 may be generally arranged to obtain from a database, such as a distributed database system 140, a compute response 132 to a query (e.g., compute request 130) generated by the client device 102. The compute response component 126 may be further arranged to place the query response into in-memory structures to form a result set that is suitable for consumption by the client application 120. As additionally depicted in FIG. 1A, the client device 102 includes a result set component 128 that may provide a format for processing a result set received from analytical calculations provided by the distributed database system 140 to generate the query response.

The client device 102 may also include a network interface 129. The network interface 129 may be generally arranged to forward queries generated by application 120 to a database, such as a compute request 130 to the distributed database 140, for processing. The network interface 129 may also be arranged to receive a response from the distributed database system 140, such as a compute response 132, and forward the compute response 132 to other components of client device 102 for processing.

In various embodiments, the compute model component 122 (and pseudo language), the interface to the compute request component 124, the interface to the compute response component 126, and/or the result set component 128 may be constructed (written) as a portable interface, which may facilitate support of the requirements of one or more client applications running on the client device 102. An advantage of this architecture is that the portable interface allows the system 100 to support new databases without requiring that a client application, such as the client application 120, modify its compute model component 122 to support the new database. In particular, for a client device 102 to support performing analytical calculations in a new database, only the internal portions of the compute request component 124 and the compute response component 126 need be (re)written.

Turning now to the distributed database system 140 shown in system 100 of FIG. 1A, the distributed database system 140 may be generally arranged to store data in multiple databases that are located in multiple nodes (not shown) of the distributed database system 140.

As shown by the example illustrated in FIG. 1A, the client device 102 may generate a compute request 130, which may be provided in a format used by the distributed database system 140. The compute request 130 is sent via network interface 129 to the distributed database system 140 for processing. The distributed database system 140 may then send a compute response 132 that includes results of computation performed at one or more nodes of the distributed database 140, where the compute response is in a format used by the distributed database system 140.

The compute response component 126 of client device 102 may then receive the compute response 132 (including a result set) from the distributed database system 140, and forward the received result set to the client application 120 via the result set component 128. In particular, the compute response component 126 may place the compute response 132 into in-memory structures to form a result set that is suitable for consumption by the client application 120.

Figure 1B:
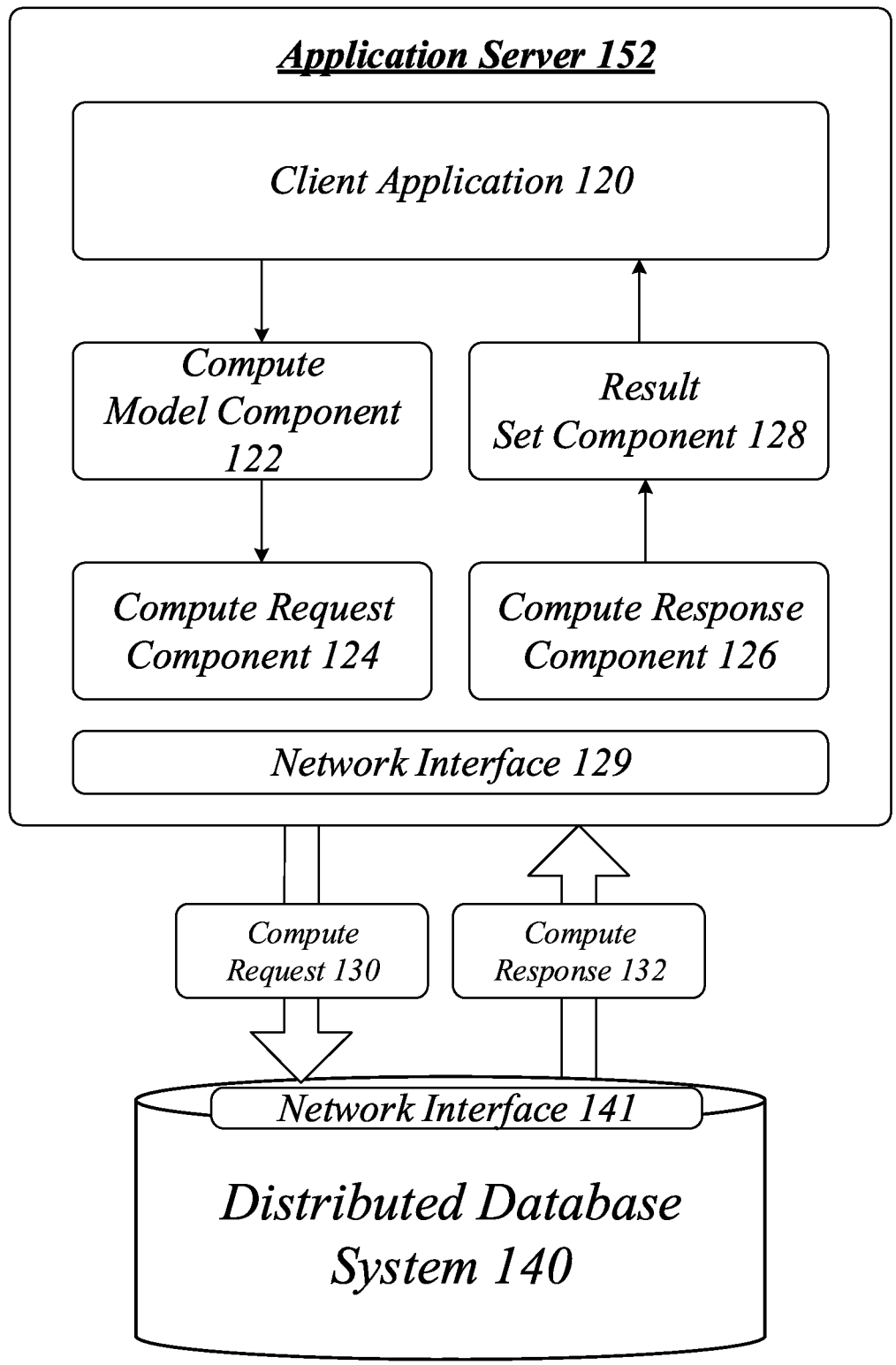
FIG. 1B illustrates another embodiment of a system to perform in-database computational programming.

FIG. 1B illustrates a block diagram of system 150 similar to system 100. As similarly discussed above with respect to system 100 the system 150 may be implemented by one or more electronic devices each having computing and/or communications capabilities. System 150 may be implemented as part of a cloud based computing architecture where one or more clients, such as client device 102, connect and communicate with a server, such as application server 152. In this exemplary embodiment, the application server 152 may include one or more components the same as or similar to the components in system 100. More specifically, the application server 152 may include a client application 120, a compute model component 122, a compute request component 124, a compute response component 126 and a result set component 128. In addition the application server may include a network interface 129 to communicate with distributed database system 140.

In various embodiments, one or more client devices may access the components on the application server 152 through an interface, such as a web browser using one or more communication protocols, such as transmission control protocol/internet protocol (TCP/IP), over any number of wired or wireless connections. Although the system 150 shown in FIG. 1B has a limited number of elements in a certain topology, it may be appreciated that the system 150 may include more or less elements in alternate topologies as desired for a given implementation. Moreover, components and/or modules of the system 150, and any electronic devices implementing some or all of the components and/or modules of the system 150, may be communicatively coupled via various types of communications media as indicated by various lines or arrows.

In various embodiments, system 150 may also be arranged to distribute a compute request 130 sent from the client application 120 to a distributed database system 140 in a manner that allows the nodes of a distributed database system 140 to perform the analytical calculation regardless of the format of the original compute request 130. In some embodiments, the application server 152 may include a processor circuit (not shown) and the client application 120 that is operative on the processor circuit may generate a general request to perform an analytical calculation on data stored in a distributed database system based on a compute model. Further, the system 150 may generate the general request without a threaded kernel service layer by the client application 120.

The general request may be originally generated in a format native to the client application 120 before being processed by the compute model component 122. As previously discussed above, a basic layout of a database-specific request, such as a SQL request, may be modeled using a common (generic) set of structures to form a compute model. The compute model may define, for example, SQL text substitution for variables, functions, and language semantics. The client application 120 may then generate a general request using the compute model, without causing re-writes of programming code when implementing the client application 120 with a new database system.

In the same or other embodiments, the database-specific request may not be an SQL request, but may be a java request such as a Hadoop map-reduce request, a HiveQL request, a PIG language request and the NoSQL databases may be Cloudant®, CouchDB®, djondb®, ElasticSearch®, MongoDB®, and so forth. As similarly discussed above with respect to the SQL request, a basic layout for the java request may also be modeled using a common set of structures to form a compute model. In these embodiments, the compute model may define, for example, text substitution for variables, functions including map and reduce, and language semantics.

The application server 152 may also include a compute request component 124 that is operative on the processor circuit to convert or translate the general request to a compute request 130 or database-specific request having a request format used by the distributed database system 140. In addition, the compute request component 124 may be operative to send the compute request 130 to a node of the distributed database system 140 having an analytic container. For example, the compute request component 124 may generate a java request such as a map-reduce request based on the general request and send the java request to a network interface 141 on the distributed database 140 for processing. In some embodiments, the network interface 141 may include a java based interface, such as a Hadoop java interface to receive the java request. The java request may include text with various structured information elements such as data insert, query, update and delete, schema creation and modification, data access control, and so forth. Further, the java request may be sent to the network interface 141 as one or more web service calls.

In the illustration FIG. 1B, the application server 152 may further include a compute response component 126. The compute response component 126 may be generally arranged to obtain from a database, such as a distributed database system 140, a compute response 132 to a query (e.g., compute request 130) generated by the application server 152. In some embodiments, the compute response 132 may be received from the network interface 141 of the distributed database system 152 by the network interface 129 of the application server 152. The network interface 141 may include a java based interface such as the Hadoop java interface, as previously discussed and the compute response 132 may be a java result, such as a map-reduce result including a result set. In various embodiments, the java based interface may communicate the java response to the application server 152 via one or more web service calls.

Once the compute response 132 is received, the compute response component 126 may be further arranged to place the query response into in-memory structures to form a result set that is suitable for consumption by the client application 120. Further, the application server 152 may include a result set component 128 that may provide a format for processing a result set received from analytical calculations provided by the distributed database system 140 to generate the query response.

Similar to the client device 102 of FIG. 1A, the application server 152 may also include a network interface 129. The network interface 129 may be generally arranged to forward queries generated by client application 120 to a database, such as a compute request 130 to the distributed database 140, for processing. The network interface 129 may also be arranged to receive a response from the distributed database system 140, such as a compute response 132, and forward the compute response 132 to other components of client device 102 for processing.

In some embodiments, the compute model component 122 (and pseudo language), the interface to the compute request component 124, the interface to the compute response component 126, and/or the result set component 128 of the application server 152 may be constructed (written) as a portable interface, which may facilitate support of the requirements of one or more client applications running on the application server 152. An advantage of this architecture is that the portable interface allows the system 150 to support new databases without requiring that a client application, such as the client application 120, to modify its compute model component 122 to support the new database.

Turning now to the distributed database system 140 shown in system 150 of FIG. 1B, the distributed database system 140 may be the same or similar to the distributed database system 140 of FIG. 1B. Moreover, the distributed database 140 of FIG. 1B may store data in multiple databases that are located in multiple nodes, may receive compute request 130 and may send compute responses 132. In some embodiments, the distributed database system 140 may also include a network interface 141 including a REST API for receiving compute requests 130 and sending compute responses 132.

In particular, the compute request 130 is sent via network interface 129 for processing. The distributed database system 140 may then send a compute response 132 that includes results of computation performed at one or more nodes of the distributed database 140, where the compute response is in a format used by the distributed database system 140.

Figure 2:
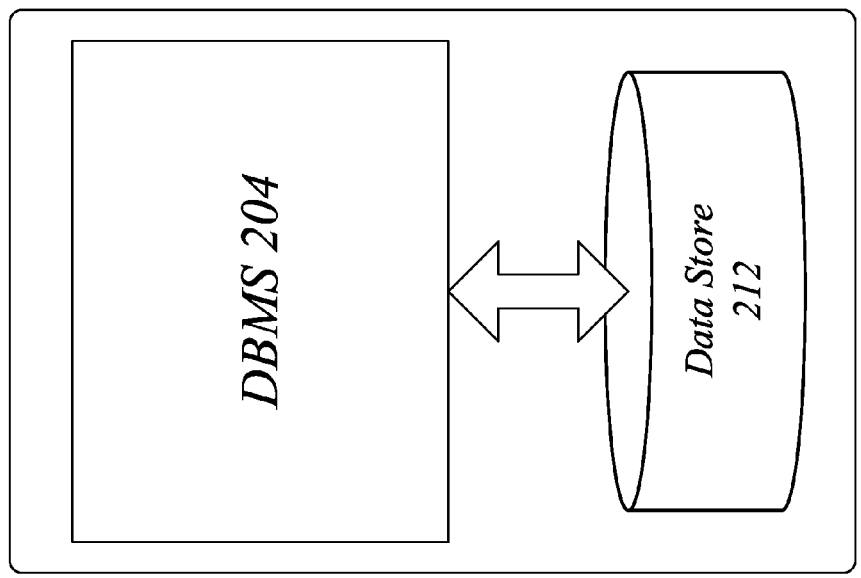
FIG. 2 illustrates an embodiment of a first database component.

FIG. 2 illustrates an embodiment of a database node 202. The exemplary database node 202 may form part of a distributed database system, such as the distributed database system 140. As shown in FIG. 2, the database node 202 may include a database management system (DBMS) 204. As further depicted in FIG. 2, the database management system 204 may be coupled to a data store 212. In general, a database node 202 of a distributed database system 140 consistent with the present embodiments may include one or more central processing units (CPU) (not separately shown), which may operate system support software. The node may also include one or more memory storage devices (e.g., storage disks), an example of which is illustrated as data store 212 in FIG. 2.

Figure 3:
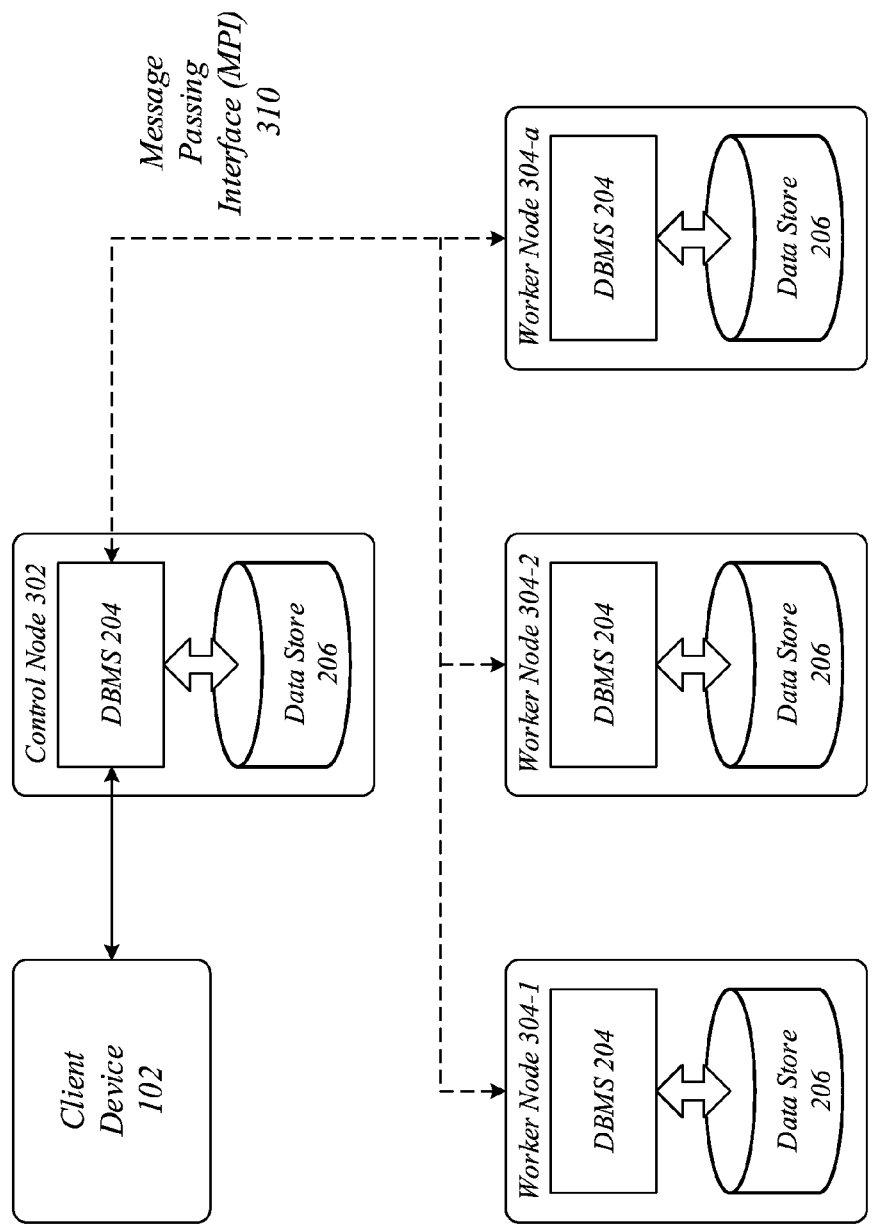
FIG. 3 illustrates an embodiment of a distributed database system.

FIG. 3 illustrates an embodiment of a distributed database system 140. The distributed database system 140 may include one or more client devices, such as client device 102. The client device 102 may couple to a central process, or control node 302, which, in turn, is coupled to one or more worker nodes 304. In general, each of the nodes of the distributed database system 140, including the control node 302, and worker nodes 304-1, 304-2, and 304-a, may include the database management system 204 and data store 206. It is worthy to note that "a" and "b" and "c" and similar designators as used herein are intended to be variables representing any positive integer. In various embodiments, the control node 302 may manage operations in one or more of the worker nodes 304. More particularly, the control node 302 may be arranged to receive and process a compute request from the client 102 when analytic computations are to be performed that require data stored in one or more of the worker nodes 304.

In various embodiments, one or more of the components of distributed database system 140 may be collocated, including the client device 102, control node 302, and one or more worker nodes 304. However, more generally, none of the components of distributed database system 140 need be collocated. Moreover, in some embodiments, more than one node of the distributed database system 140 may be arranged to assume the role of the control node. Thus, in some scenarios, the component designated as control node 302 may assume the role of a worker node, while one of the worker nodes 304-1 to 304-a may assume the role of the control node.

In various embodiments, in operation a query request received by control node 302 may be received as a compute request 130, as described above with respect to FIG. 1A. For example, the client device 102 may generate a general request to perform an analytical calculation, which is processed by the compute model component 122 to construct an in-memory work request to be performed by one or more worker nodes 304. Subsequently, the compute request component 124 may generate a compute request by translating the basic structures and pseudo information of the general request into database-specific SQL text that is appropriate for the worker nodes 304-1 to 304-a of the distributed database system 140. The database-specific SQL text may subsequently be transmitted over interface 129 as the compute request 130.

In particular embodiments, the general request generated by client device 102 may be received with a name for the distributed database system 140 to process the general request. Accordingly, when the distributed database system 140 is designated, the compute request 130 is transmitted to control node 302.

Consistent with the present embodiments, when the control node 302 receives a compute request 130 sent from the client device 102, the control node 302 may unpack the compute request 130, parse the compute request 130, and establish a flow of execution steps to perform an operation such as an analytical calculation using one or more worker nodes 304 of the distributed database system 140.

As illustrated in FIG. 3, the distributed database system 140 may further include a communication protocol such as the message passing interface (MPI) 310. When the control node 302 establishes a flow of execution for a compute request 130, the control node 302 may distribute the execution steps to worker nodes 304-1 to 304-a via the message passing interface 310. Subsequently, results may be returned from one or more worker nodes 304-1 to 304-a to the control node 302 via the message passing interface 310.

In various embodiments, each of multiple worker nodes 304-1 to 304-a may contain a respective partition of data to be processed according to the compute request. The control node 302 may establish an execution flow in which messages are sent to multiple different worker nodes 304-1 to 304-a. Each worker node 304-1 to 304-a may subsequently load and execute a specified compute function for the partition of data contained by that worker node.

When each of the worker nodes 304-1 to 304-a, that receives a message to execute a compute function from control node 302, completes execution of its specified compute function on its partition of data, the worker node 304 may return results to the control node 302 through the message passing interface 310. The results may subsequently be returned from the control node 302 to the client device 102 that generated the compute request.

Although FIG. 3 illustrates a distributed database network 142 that comprises a control node 302 and multiple worker nodes 304-a, more general embodiments include any network in which an interface is provided so that a client device may initiate the execution of a compute request within a group of foreign machines, utilize resources of the foreign machines, including memory, input/output functionality, loading of images, launching of threads, and/or utilize a distributed database structure to send and receive message instructions and results.

Figure 4A:
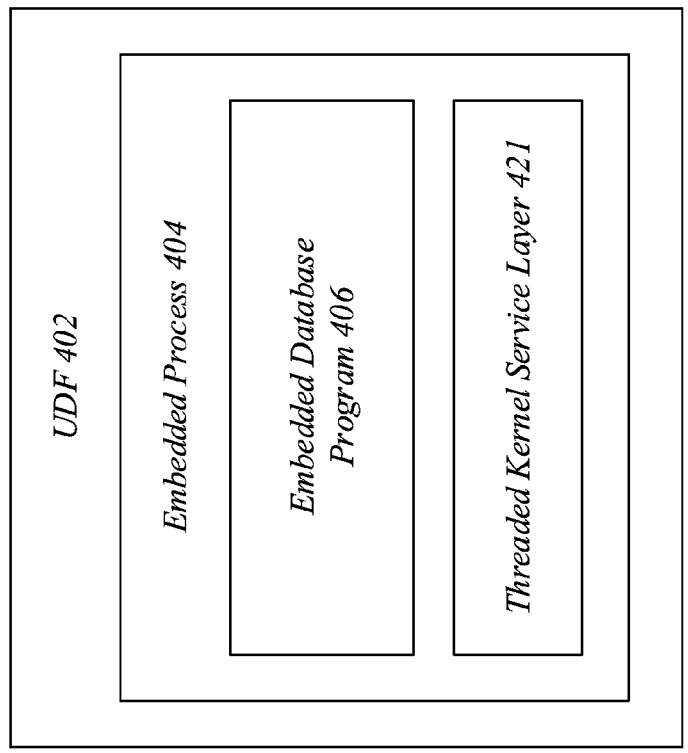
FIG. 4A illustrates an embodiment of an analytic container.

FIG. 4A illustrates an embodiment of an analytic container 400. In various embodiments, one or more nodes in a distributed database system 140 may include an entity that includes a set of components sufficient to perform analytic calculations as requested by a client application 120, referred to herein as an "analytic container." FIG. 4A illustrates an example of an analytic container 400. In some embodiments, the analytic container 400 may be deployed in one or more worker nodes 304-a of a distributed database system 140 in order to provide a mechanism for processing compute requests 130 that are received from a client device 102. In particular embodiments, the analytic container 400 may facilitate performing an analytic calculation for a compute request 130, where each node containing the analytic container 400 is deployed in a database foreign to the client device 102 that generates the compute request 130. In some embodiments, the analytic container 400 may be arranged to operate in a virtual machine environment, among other types of partitioned, encapsulated, secure, or restricted processing environments.

As shown in FIG. 4A, the analytic container 400 may be provided with several components. In the illustrated embodiment shown in FIG. 4A, analytic container 400 may include a user defined function (UDF) 402. The UDF 402 may provide a mechanism for an application program, such as the client application 120, to transfer data to or receive data from the data stores of the distributed database system 140 in which the analytic container 400 is deployed.

The user defined function 402 may include an embedded process 404 that may be executed by the user defined function 402. The embedded process 404 may generally replicate an execution environment hosted within the distributed database system 140 that is similar to an execution environment used by the client application 120.

The client application 120 may be an application program that is specifically designed to work on a computing platform having a defined set of software and hardware components. For instance, the client application 120 may utilize a specific operating system (OS) to manage computer hardware resources and provide common services for executing the client application 120. The OS may comprise a real-time OS, a multi-user OS, a multi-tasking or multi-thread OS, a distributed OS, an embedded OS, and so forth. The components of an OS all exist in order to make different parts of a computer work together. The client application 120 needs to go through the OS in order to use any hardware resources, whether it is receiving control directives from an input device, allocating memory, scheduling processing threads for a processor, or establishing a network connection. For instance, an OS includes a kernel that, with the aid of firmware and device drivers, provides a basic level of control over all computer hardware. In another example, an OS provides an interface between application programs and computer hardware, so that an application program can interact with the hardware by obeying rules and procedures programmed into the OS. As such, the client application 120 and the OS utilized by the client application 120 are normally tightly coupled and integrated with each other.

This tight integration becomes problematic when attempting to move the client application 120, or portions of the client application 120, between computing platforms. This often requires the client application 120 to be re-written in order to execute on a different computing platform, or in a networked environment, working with a different computing platform, such as the distributed database system 140. Conventional solutions include coding an interface with a set of custom APIs designed for the distributed database system 140. This is expensive and time consuming. Another solution is to re-code portions of the client application 120 for execution on the distributed database system 140. However, this may be even more costly and time consuming given the highly specialized nature of the client application 120. For instance, the client application 120 may include software components specifically designed for sophisticated and complex analytical calculations. Another solution is to code the client application 120 using some form of machine-independent programming language capable of execution on multiple computing platforms. Again, this is suitable for simple programs, and is extremely difficult for larger application programs with complex software components designed for specialized tasks.

The embedded process 404 attempts to solve these and other problems by providing a set of software components mimicking an execution environment for the client application 120. This allows the client application 120, or portions of the client application 120, to be executed using an in-database model. In one embodiment, the embedded process 404 may comprise or be implemented as a virtual machine. In general, a virtual machine is a completely isolated guest operating system installation within a normal host operating system. The virtual machine may be implemented with either software emulation, hardware virtualization, or a combination of both. The virtual machine may further be designed to provide a system platform which supports execution of a complete OS, or a process virtual machine designed to execute a single program, process or thread. In one embodiment, the embedded process 404 may be a virtual machine specifically designed to execute portions of the client application 120. These portions may include, for example, components designed to perform complex analytical calculations.

The analytic container 400 may include one or more embedded database programs 406, which may be a component of the embedded process 404, or arranged to be executed by the embedded process 404. An embedded database program 406 is an independent software program designed to replicate a portion of the client application 120. In one embodiment, the client application 120 may comprise special purpose statistical software for statistical analysis having software components designed to perform complex analytical calculations. In this case, the embedded database program 406 may replicate a portion of the client application 120 specifically designed to perform the analytical calculations. Analytical calculations may generally comprise any calculations that are computationally intensive or require complex mathematical operations, such as statistical calculations, inferential statistics, or descriptive statistical calculations. The statistical calculations may be designed to support different classes of statistical calculations, including linear models, non-linear models (e.g., neural networks), generalized linear models, multilevel models, and so forth. Examples of analytical calculations may include without limitation statistical model calculations (e.g., probability distribution function, probability density function, etc.), linear model calculations, non-linear model calculations, generalized linear model calculations, multilevel model calculations, X'X, coefficient of determination $R^2$, analysis of variance calculations, Chi-squared test calculations, correlation calculations, factor analysis calculations, Mann-Whitney U calculations, mean square weighted deviation calculations, regression analysis calculations, Spearman's rank correlation coefficient calculations, student's t-test calculations, time series analysis calculations, goodness of fit calculations, fraction of variance calculations, Pearson product-moment correlation coefficient, Nash-Sutcliffe model efficiency coefficient, simple regression calculations, multiple regression calculations, regression model validation calculations, proportional reduction in loss calculations, root mean square deviation calculations, multiple correlation calculations, and so forth. The embodiments are not limited in this context.

An embedded database program 406 replicating portions of the client application 120 may be written in any suitable programming language as desired for a given implementation. In various embodiments, an embedded database program 406 may be written in a programming language matching the programming language used for the client application 120, or interoperable with the programming language used for the client application 120. In one embodiment, for example, a client application 120 may be written in a SAS programming language, such as a BASE SAS programming language. In one embodiment, an embedded database program 406 may be written in a SAS programming language, such as a SAS DS2 programming language as defined in SAS 9.3 DS2 Language Reference, July 2011, and its progeny, revisions, and variants. The DS2 programming language is a SAS proprietary programming language appropriate for both advanced data manipulation and data modeling applications. The syntax of the DS2 language intersects with the SAS DATA step and also includes additional data types, American National Standards Institute (ANSI) SQL types, programming structure elements, and user-defined methods and packages. In addition, the DS2 SET statement has been enhanced to accept ANSI SQL: 1999. This allows SQL preprocessing of input tables which effectively combines the power of the two languages. The embodiments are not limited to DS2, and other programming languages may be used as desired for a given implementation.

In various embodiments, in order to execute an analytic calculation in response to a compute request 130, one or more nodes of a distributed database system 140, such as one or more of the worker nodes 304-1 to 304-$a$, may each implement an instantiation of the analytic container 400 to perform an individual set of analytic calculations on data local to that worker node 304-a. The results of the analytic calculations may then be returned from the individual nodes as a group of result sets that are sent to a client device 120 that originally generated the compute request 130.

Referring also to FIG. 1A, in some embodiments, the compute response component 126 of a client device 102 may then receive the compute response 132 from the distributed database system, where the compute response 132 includes a result set from the analytic container 400 of the node(s) of the distributed database system 140 that were used to perform the analytic calculation. The compute response component 126 may forward the received compute response 132 to the client application 120, via the result set component 128.

In some embodiments, the user defined function 402 of an analytic container 400 may execute the embedded process 404, where the embedded process 404 includes a threaded kernel service layer 421 that matches the threaded kernel service layer 121 used by the client application 120 that generated a compute request 130 to be executed by the analytic container 400. In particular, the client application 120 may employ the threaded kernel services layer 121 to obtain and use machine resources and database resources.

In a particular embodiment, the embedded database program 406 of the user defined function 402 may use a threaded kernel service layer 421 that matches the threaded kernel service layer 121 of the client application 120 that generated a compute request 130 to be executed by the analytic container 400. In one example, the embedded database program 406 is coded in the same programming language as the client application generating the compute request 130.

In operation, in order for a client application 120 to generate a compute request 130, for execution by an analytic container 400, the name of the embedded database program 406 to be executed may be provided as part of the compute request 130. For example, in an embodiment, the compute request component 124 may be operative to construct an input select list for a compute request 130. The compute request component 124 may be further operative to construct an output select list based on a format for the result set for the compute request 130. In addition, the compute request component 124 may be operative to pass a name of an embedded database program 406 that is arranged to use a threaded kernel service layer 421 matching the threaded kernel service layer 121 used by the client application 120.

To perform an analytic calculation in the distributed database system, when a UDF 402, such as a table-based UDF, is invoked on a worker node 304-a, the UDF 402 may then load and boot the threaded kernel service layer 421 specified by the compute request 130 to match that of the client application 120. For example, a DS2 program may be written and deployed on each of the analytic containers 400 of the worker nodes 304-a (e.g., stored in a database table, stored on the file system, submitted as a character constant program string in the SQL query). In some embodiments, the analytic calculation may be based upon an intermediate program variable used during the analytic calculation, such as loop control variables, internal arrays, or retained variables between observations, as created and used in the DS2 program.

In a further embodiment, the compute request component 124 of the client device 102 may be operative to publish an embedded database program, such as embedded database program 406, that is arranged to use a threaded kernel service layer 421 matching the threaded kernel service layer 121 used by the client application 120, to the analytic container 400. In addition to publishing the embedded database program 406, in other embodiments, the client device 102 may publish meta-information associated with the embedded database program 406. In some embodiments, a ModelMetadata field may be employed to publish meta-information used by the DS2 programs during execution in the analytic container 400, which may include DS2 programs for a variety of different industries. In other embodiments, published meta-data may involve a list of words that are associated with a text miner program that is operable to run in the analytic container 400. In still other embodiments, the published meta-data may be meta-data associated with a data mining program.

In accordance with various embodiments, the user defined function 402 may be table-based such that the UDF 402 operates over all records of the table. Thus, in response to a compute request 130, an instance of the user defined function 402 may be launched on multiple worker nodes 304-a that each implement an analytic container 400. Because each of the multiple worker nodes 304-a that each implement an analytic container 400 may read a different partition of data, the launching of the UDF 402 may implement parallel execution across the entire table. Each result set generated by a different analytic container 400 may be provided in parallel as a compute response to a control node 302 that forwards the result sets to the client application 120 that generated the compute request 130. In some embodiments, the result set provided by one node are assembled together with other result sets received with other compute responses generated by other nodes.

Figure 4B:
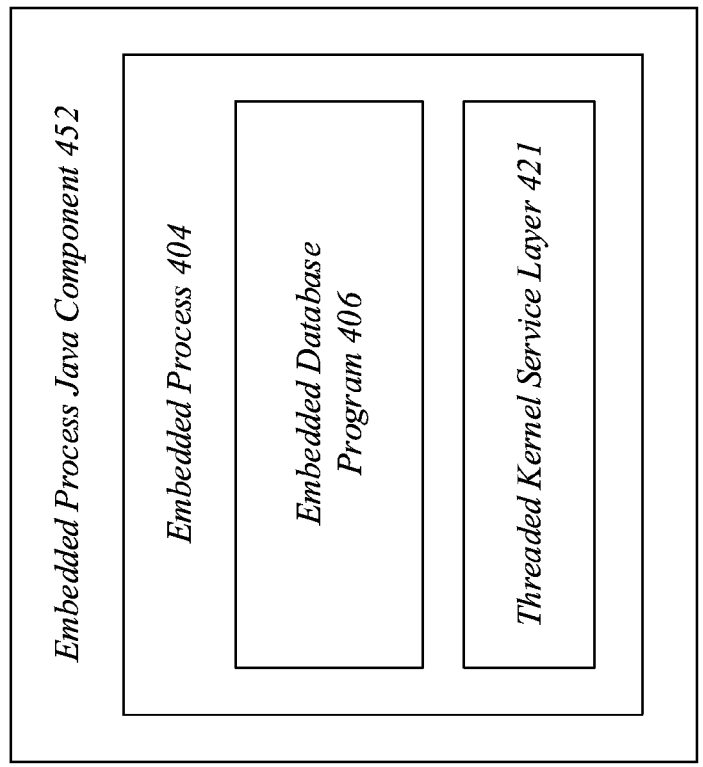
FIG. 4B illustrates a second embodiment of an analytic container.

FIG. 4B illustrates a second embodiment of an analytic container 450. In various embodiments, analytic container 450 may be similar to analytic container 400 discussed above with respect to FIG. 4A and may be employed in one more worker nodes. Analytic container 450 may also include embedded process 404, an embedded database program 406 and a threaded kernel service layer 421. Analytic container 450 may also include an embedded process java (EPJ) component 452 which may perform similar operations as the UDF 402 in analytical container 400.

The EPJ component 452 may provide a mechanism for an application program, such as the client application 120, to transfer data to or receive data from the data stores of the distributed database system 140 in which the analytic container 450 is deployed. As will be discussed in more detail below in FIGS. 15-20, the EPJ component 452 may be utilized by a map-reducer process to perform an analytical calculation based on a compute request. Moreover, the EPJ component 452 may receive information, such as input rows, from a mapper component, and initiate or invoke the embedded process 404, the embedded program 406 and the threaded kernel service layer 421 to process the information. In addition, the EPJ component 452 may provide the processed information to a reducer component to perform post processing including finalizing the rows to form a compute response. In some embodiments, analytical calculations may be chained together or compute in series such that the output of the reducer component may be the input of a second or next mapper component to perform a second calculation. This process may be repeated for any number of calculations based on the compute request.

Moreover, the embedded process 404, the embedded database program 406 and threaded kernel service layer 421 of analytic container 450 may provide similar functionality as previously discussed. The embedded process 404 may include the embedded database program 406 and the threaded kernel service layer 421 and may include an execution environment hosted within the distributed database system 140 to process the compute request. Further, the embedded database program 406 of analytic container 450 may also replicate a portion of the client application 120, as previously discussed and the threaded kernel service layer 421 may be generally arranged to provide an array of portable services, definitions, data formats, and drivers to support various analytical procedures and programming languages.

In some embodiments, the analytic container 450 may be used in a cloud-based computing architecture as similar discussed above with respect to FIG. 1B. In these or other embodiments, a client application 120 may not include a threaded kernel service layer. Thus, the threaded kernel service layer 421 may be predetermined or predefined. For example, a DS2 program may be written and deployed on each of the analytic containers 450 of the worker nodes 304-a and may be utilized to process a compute request 130.

Figure 5:
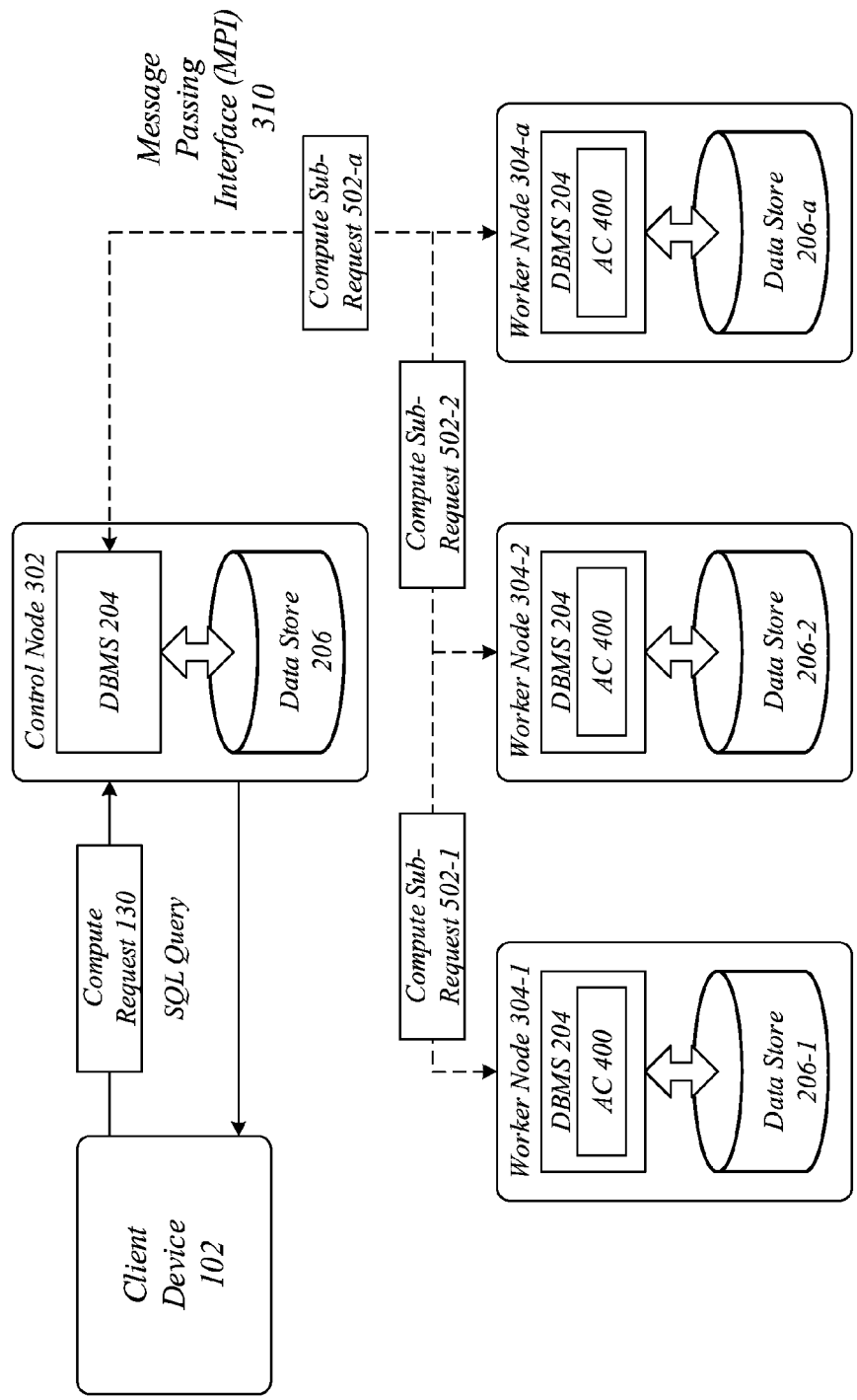
FIG. 5 illustrates an exemplary implementation of a database.

FIG. 5 illustrates another embodiment of the distributed database system 140 that illustrates operation of the analytic container 400. In particular, FIG. 5 depicts an instance in which multiple worker nodes 304-1 to 304-a execute an analytic calculation in response to an SQL Query sent from a client device 102. As illustrated, the client device 102 may generate a compute request 130 that is transmitted to the control node 302. The control node 302 may then forward the compute request 130 over the message passing interface 310 as a set of compute sub-requests 502-b to multiple worker nodes of the worker nodes 304-1 to 304-a.

In the example illustrated in FIG. 5, a compute request 130 may be divided into two sub-requests: a sub-request 502-1, which is forwarded to the worker node 304-1, and a compute sub-request 502-2, which is forwarded to the worker node 304-2. Each of the different compute sub-requests 502-1, 502-2 may require a different partition of data to be processed. Once each worker node 304-1, 304-2 receives the compute sub-request 502-1, 502-2, respectively, the worker nodes 304-1, 304-2 may each execute its analytic container 400 to perform its analytic calculation. For example, the worker node 304-1 may read a first partition of data from the data store 206-1 to execute an analytic calculation in response to the compute sub-request 502-1. Likewise, the worker node 304-2 may read a second partition of data from the data store 206-2 to execute an analytic calculation in response to the compute sub-request 502-2. In this manner, parallel analytic computations may be performed in the worker nodes 304-1 and worker node 304-2 in response to the original compute request 130.

Although the illustration in FIG. 5 depicts parallel execution of only two different sub-requests 502-1, 502-2, in various embodiments, any number of different worker nodes 304-a of a distributed database system 140 may process respective compute sub-requests 502-b, where each worker node 304-a processes a different compute sub-request 502-b.

Figure 6:
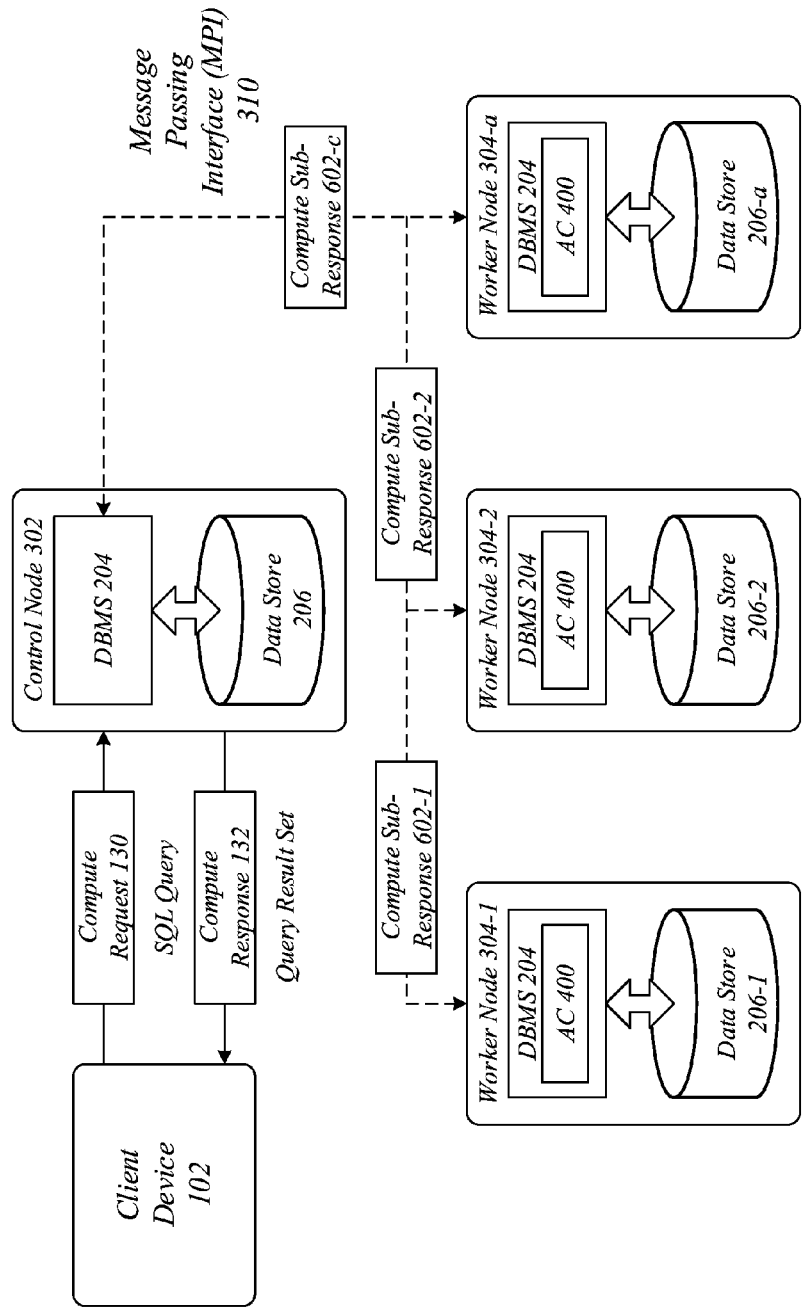
FIG. 6 illustrates another exemplary implementation of a database.

FIG. 6 depicts further operation of the distributed database system 140. Continuing with the example illustrated in FIG. 5, the particular scenario illustrated in FIG. 6 depicts generation of a compute response 132 by the distributed database system 140, in response to the compute request 130 generated by the client device 102. After each analytic container 400 of a respective worker node 304-1, 304-2 receives a respective compute sub-request 502-1, 502-2, the respective worker node 304-1, 304-2 may each execute the analytic container 400 to perform its individual analytic calculation, and subsequently return the results as a compute sub-response 602-c.

FIG. 6 details an example in which the worker nodes 304-1, 304-2 of the distributed database system 140 generate respective compute sub-responses 602-c, such as compute sub-responses 602-1, 602-2 generated by the worker nodes 304-1, 304-2, respectively. The compute sub-responses 602-1, 602-2 may be forwarded over the message passing interface 310 to the control node 302, which assembles the compute sub-responses 602-c to generate a compute response 132 to be sent to the client device 102.

Although the illustration in FIGS. 5 and 6 depict parallel execution of only two different sub-requests 502-1, 502-2, and generation of two compute sub-responses 602-1, 602-2, respectively, it may be appreciated that any number of different worker nodes 304-a of a distributed database system 140 may process respective sub-requests, where each worker node 304-a processes a different sub-request and generates a concomitant sub-response.

As further illustrated in FIG. 6, the compute response 132 may form a query result set that is received by the client device 102 that generated the compute request 130. Referring also to FIG. 1A, when the compute response 132 is received by the client device 102 the compute response component 126 may place the compute response 132 into a group of in-memory structures to form a result set that is suitable for consumption by the client device 102. If the compute response 132 is in a format native to the worker nodes 304, the compute response component 126 may then repackage the compute response 132 as a result set in the format of the client application 120 of client device 102. Subsequently, the client device 102 may employ the interface of the result set component 126 to access the data of the compute response.

One advantage of the embodiments set forth above with respect to FIGS. 1 to 6 is that the same type of analytic calculations that are performed in a client application 120 of a client device 102 can be implemented in a distributed database system 140, such as a foreign database(s), which may execute the analytic calculations in an efficient manner by performing massive parallel processing (MPP) across multiple databases. Furthermore, the client application 120 need not acquire knowledge of the result set format for every database that is accessed to perform analytic calculations. Instead, the compute response component 126 may repackage a compute response 132 received in a native database format into a format of the client application 102.

In further embodiments, the system 100 may include an open database interface to receive the compute response 132 from a node of the distributed database system 140. The open database interface may be arranged to facilitate the ability of the client application to query data from a distributed database network, regardless of the operating system or database management system employed. The open database interface may comprise an application programming interface (API) that many applications can use to access structured query language (SQL) databases over a distributed database system 140.

Figure 7:
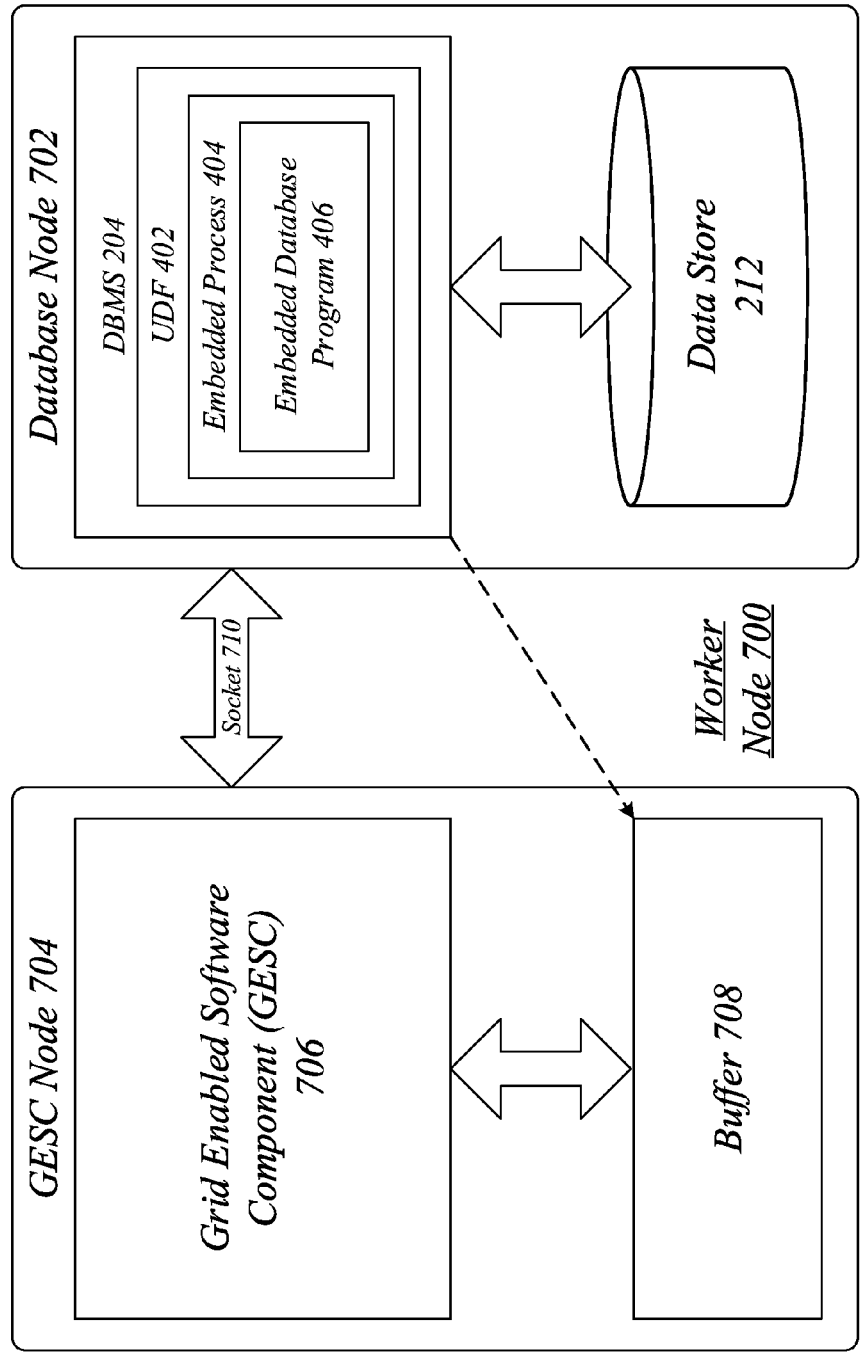
FIG. 7 illustrates an embodiment of a second database component.

In various additional embodiments, a worker node 304-a of a distributed database system 120 may contain a database node and a grid enabled software component (GESC) node. FIG. 7 depicts an embodiment of a distributed database system 140 that illustrates one database worker node of the distributed database system 140. The database worker node includes a database node 702 and a GESC node 704.

In various embodiments, the database node 702 may generally include the components of worker nodes 304-a illustrated in FIGS. 4-6, while the GESC node 704 includes a GESC 706 and buffer 708. The GESC 706 may execute on a data processor associated with the worker nodes of the distributed database system 140 via a network that may include a message passing interface, such as MPI 310. In general, each GESC 706 may engage in point-to-point communication with the GESC at another worker node or control node, or in collective communication with multiple GESCs via a network (not shown). The GESC 706 at each node in distributed database system 140 may contain identical software instructions, and each node in the distributed data database system 140 may be capable of operating as either a control node or a worker node. In particular, the GESC at a control node of the distributed data database system 140 may be operable to communicate with a client application, such as the client application 120.

In the example illustrated in FIG. 7, in operation during an analytical calculation, an input data field may be transmitted into the UDF 402 of database node 702 according to conventional DBMS specifications. Once the calculations are performed using data from the data store 212, the results may be stored into the buffer 708. A socket 710 between the database node 702 and GESC node 704 may be used to synchronize the read and writing of the buffered data. Consistent with the embodiment of FIG. 7, the embedded process 404 may be used to execute any required threaded kernel extension (TKE), including a DS2 program, or other language or TKE algorithm, where a threaded kernel extension denotes a routine added to the kernel. The arrangement of distributed database system 140 as shown in FIG. 7 facilitates using a portable program, such as a portable DS2 program, to perform an analytical calculation over a partitioned table, such that the results may be fed to a later-staged along-side the database analytical calculation.

Figure 8:
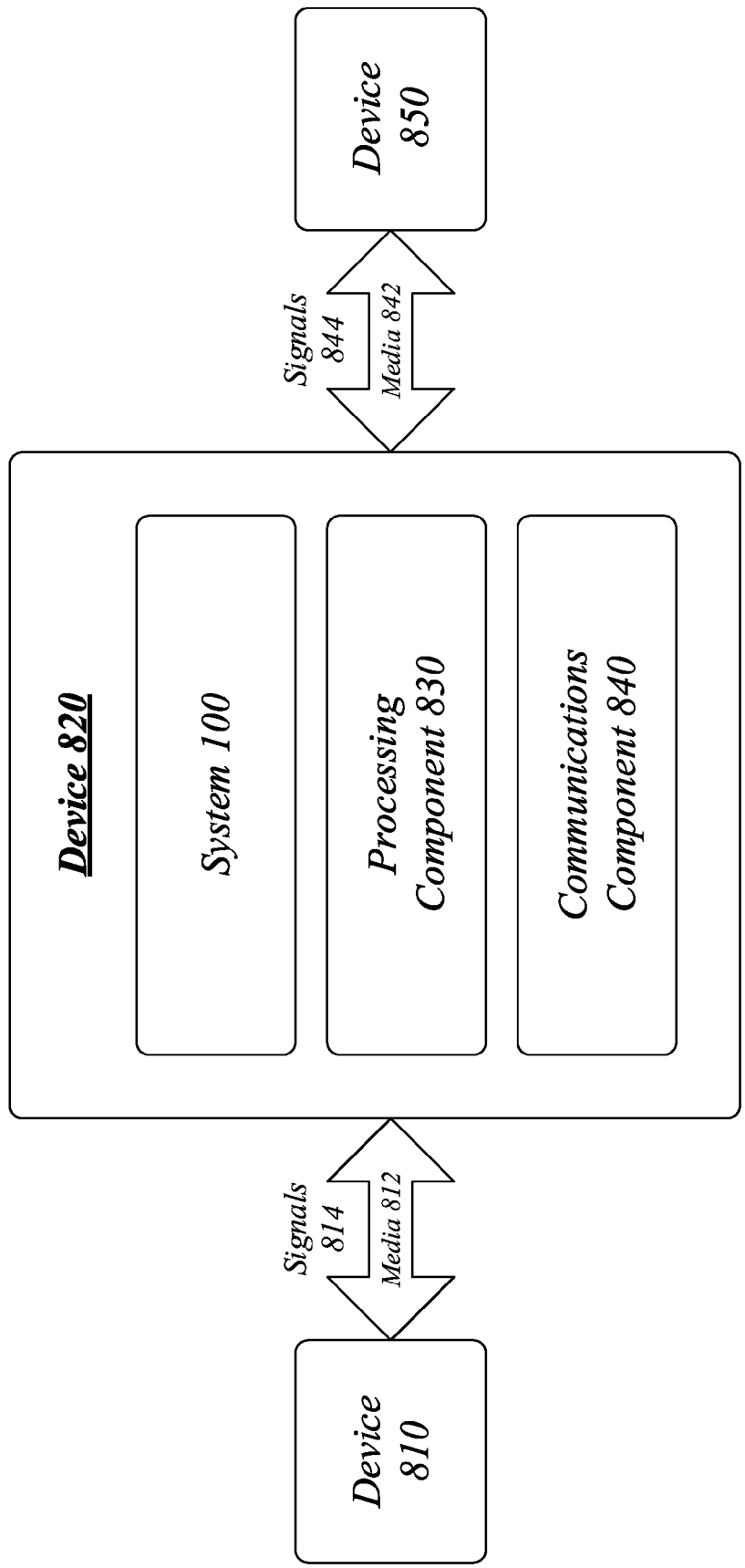
FIG. 8 illustrates an embodiment of a centralized system for the system of FIG. 1A and FIG. 1B.

FIG. 8 illustrates a block diagram of a centralized system 800. The centralized system 800 may implement some or all of the structure and/or operations for one or more of the components of the system 100, such as the client device 102, in a single computing entity, such as entirely within a single device 820.

The device 820 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation. For example, the devices 810, 850 may include servers, routers, or other components in a network that links the client device 102 to database nodes 202, such as control node 302 and worker nodes 304-a, in a distributed database system 140. The embodiments are not limited in this context.

FIG. 9 illustrates a block diagram of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In general, the client device 910 may be the same or similar to the client device 820 as described with reference to FIG. 8. In various embodiments, the client system 910 and the server system 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The client device 910 may comprise or employ one or more client applications that operate to perform various methodologies in accordance with the described embodiments. In one embodiment, for example, the client device 910 may implement the client application 120 to direct a distributed database to perform analytical calculations.

The server device 950 may comprise or employ one or more server programs that operate to perform various methodologies in accordance with the described embodiments. In one embodiment, for example, the server device 950 may implement the analytic container 400 to perform analytical calculation in a distributed database system 140, including the generation of a compute response 132 to a compute request 130 received from the client device 910.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein. In one embodiment, for example, the client device 102 may perform the operations of logic flow 1000.

In the illustrated embodiment shown in FIG. 10, the logic flow 1000 includes a block 1002, in which a general request is generated to perform an analytical calculation on data stored in a distributed database system comprising a control node and multiple worker nodes, where the general request is generated by a client application using a threaded kernel service layer. For example, the client application 120 of the client device 102 may send a general request to the compute model component 122 using the threaded kernel service layer 121.

The logic flow 1000 may continue at block 1004, where the general request is converted to a compute request having a request format used by the distributed database system. For example, the compute request component 124 may receive a general request from the compute model component 122 in a format of the client application 120. The compute request component 124 may then generate a compute request, such as compute request 130, which has the format specifically used by the distributed database system 140, such as a SQL request.

The logic flow 1000 may proceed to block 1006, where a compute request is sent to a node of the distributed database system. For example, the compute request 130 may be forwarded from client device 102 to the control node 302 of distributed database system 140, and then to a worker node 304-1 to 304-a of the distributed database system 140. In one specific example, the compute request 130 may be provided as compute sub-requests 502-1, 502-2 to respective worker nodes 304-1, 304-2.

The logic flow 1000 may proceed to block 1008, in which a compute response is received from the node of the distributed database system, where the compute response includes a result set of the analytical calculation performed on data local to the node from an analytic container implemented by the node. For example, the worker nodes 304-1, 304-2, which each include an analytical container 400, may generate respective compute sub-responses 602-1, 602-2 that are received by control node 302, and forwarded as compute response 132 to be received by client device 102. The compute response 132 may include results of the analytical computation, and may be returned through an open database interface. The open database interface may comprise an API that many applications can use to access SQL databases over a distributed database network. The client application 120 can then decide whether to insert the results back into its internal memory structures and continue processing, write the results to a file of some known format or data schema, or leave the results in the database as a new table.

Figure 11:
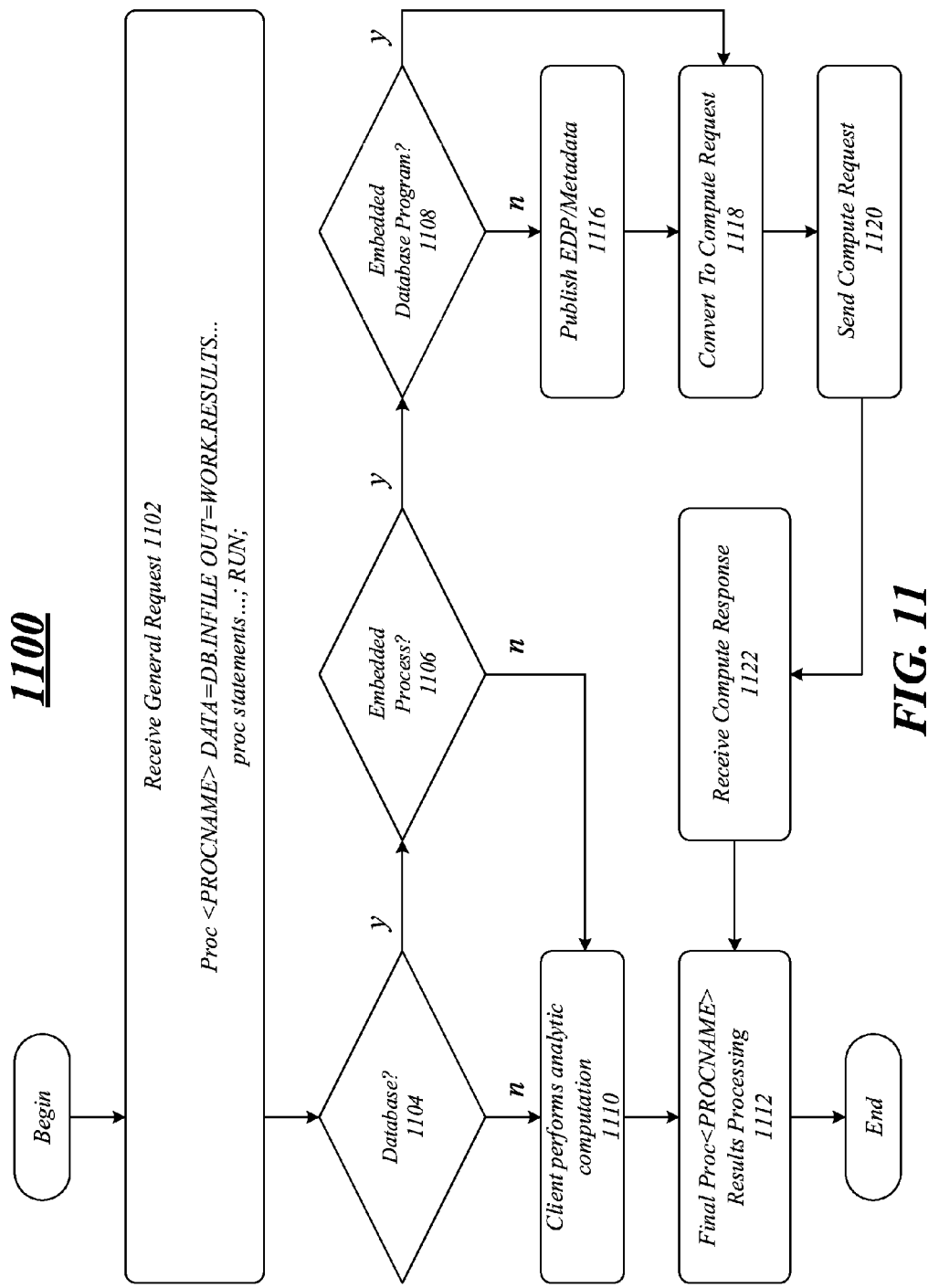
FIG. 11 illustrates an embodiment of a second logic flow.

FIG. 11 illustrates one embodiment of a second logic flow 1100. The logic flow 1100 may be representative of some or all of the operations executed by one or more embodiments described herein. In the illustrated embodiment shown in FIG. 11, the logic flow 1100 includes a block 1102, in which a general request is received, where the general request may have the format:

Proc <PROCNAME> DATA=DB.INFILE OUT=WORK.RESULTS...;
    proc statements...; RUN;

The logic flow 1100 may proceed to block 1104, where a determination is made as to whether the general request is invoking a database to perform an analytic calculation. For example, if the libname, DB does not point to a database, the client application 120 determines that no database is to be invoked to perform analytic calculation, and the logic flow proceeds to block 1110.

At block 1110, the client performs an analytical calculation. For example, a client application 120 of client device 102 may generate a general request that is to execute an analytic calculation in the client device 102 itself. The client application 120 then may read data from a database and perform the analytic calculation on the read data. The logic flow then proceeds to block 1112.

At block 1112, the results processing of the analytic calculation takes place. The client application 120 may generate, for example,
    Final Proc<PROCNAME>.
After the results processing the logic flow ends.

If, at block 1104, a determination is made that the general request points to a database, the logic flow moves to block 1106. At block 1106, a determination is made as to whether the specified database includes an embedded process operable to perform an in-database analytic calculation according to the general request. If not, the logic flow returns to the block 1110.

If, at block 1106, it is determined that the specified database does include an embedded process to perform an in-database analytic calculation, the logic flow proceeds to block 1108.

At block 1108, a determination is made as to whether the database includes an embedded database program to execute the analytical calculation. If so, the logic flow moves to block 1118. At block 1118, the general request is converted into a compute request. For example, a general request generated by the client application 120 may be forwarded to the compute request component 124 if the database designated in the general request includes the appropriate embedded database program to execute the general request. The compute request component 124 may accordingly generate a compute request 130.

If, at block 1108, a determination is made as that the database does not include an embedded database program to execute the analytical calculation, the logic flow proceeds first to block 1116 before proceeding to block 1118. At block 1116, an embedded database program 406 may be published together with any metadata associated with the embedded database program. The embedded database program/metadata may be published to an analytic container 400, where it is executed to perform the analytic calculation. Subsequently, the logic flow moves to block 1118, where the general request is converted to a compute request.

After block 1118, the logic flow moves to block 1120 where a compute response is sent from the database that executed the analytical calculation. The logic flow then proceeds to block 1122 where the compute response is received by the client device that generated the compute request. The logic flow then proceeds to block 1112 before terminating.

Figure 12:
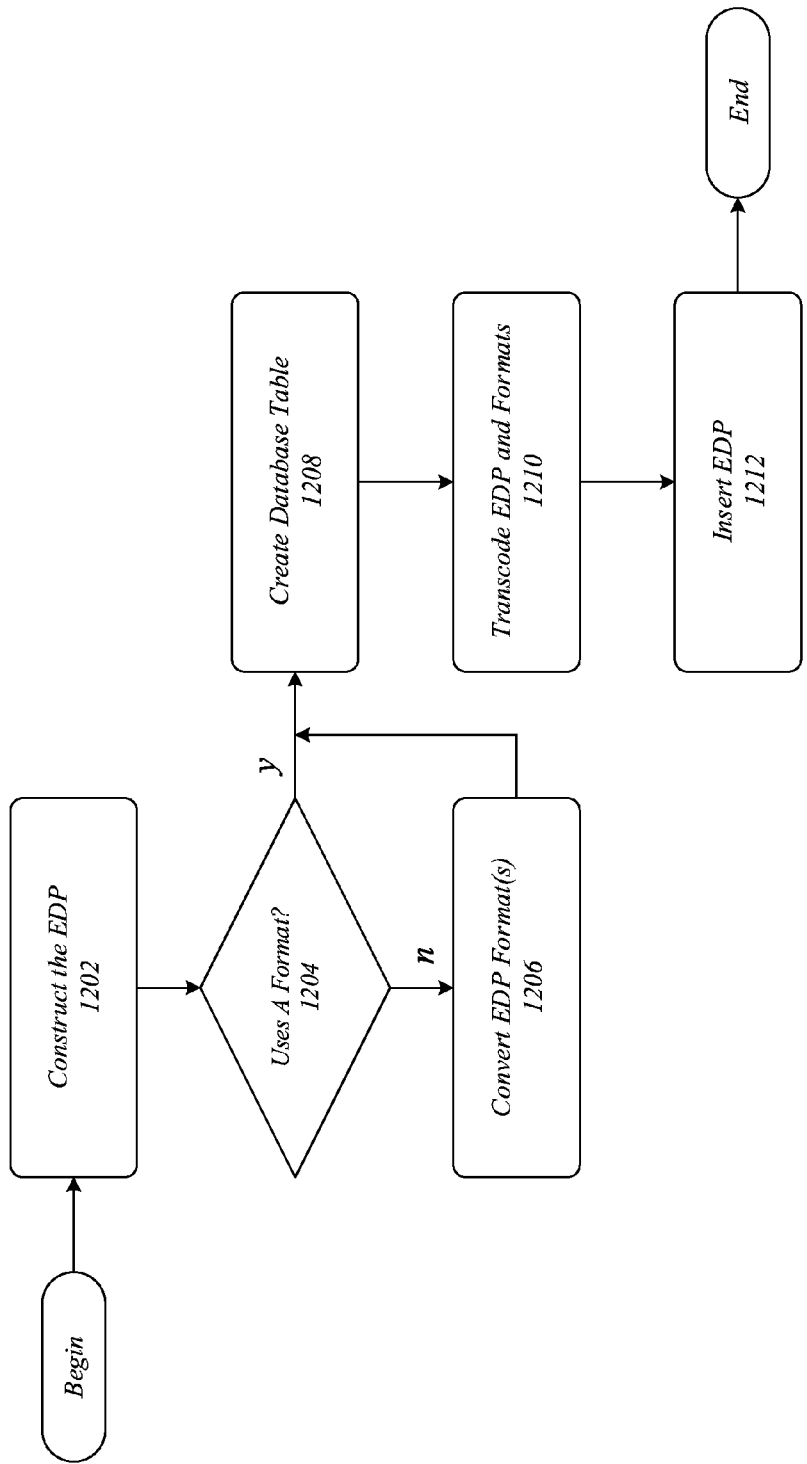
FIG. 12 illustrates an embodiment of a third logic flow.

FIG. 12 illustrates one embodiment of a third logic flow 1116. The logic flow 1116 may be representative of some or all of the operations executed by one or more embodiments described herein. In the illustrated embodiment shown in FIG. 12, the logic flow 1116 may represent components of the block 1116 of FIG. 11, where the electronic database program is published. As illustrated, the logic flow 1116 includes a block 1202 where an embedded database program is constructed. For example, the embedded database program 406 may be a DS2 program, among others.

The logic flow then proceeds to block 1204 where a determination is made as to whether the embedded database program to perform the analytical calculation uses a format of the client application that generated the compute request. If not, the logic flow proceeds to block 1206.

At block 1206, the format(s) of the embedded database program to be used to perform the analytical calculation is converted. For example, the embedded database program format may be converted from a catalogue-based object into an extensible markup language (XML) character string.

If, at block 1204, the format of the embedded database program is the same as that of the client application, the logic flow moves to block 1208. At block 1208, a database table is created. For example, the database table may be created using SQL.

The logic flow then proceeds to block 1210. At block 1210, the embedded database program and formats are transcoded. In one example an embedded DS2 program is transcoded, and an XML received from a client session character encoding is formatted into a unicode transformation format (UTF) that is expected by the client application, including without limitation UTF-1, UTF-7, UTF-8, UTF-16, UTF-32, and so forth. In one embodiment, the received XML is formatted into a UTF-8 encoding, which is a variable-width encoding that can represent every character in the unicode character set.

The logic flow then moves to block 1212 where the embedded database program is inserted. For example, an embedded DS2 program may be inserted and the XML may be formatted (as blobs or clobs) as one or more records into the publish table, using SQL.

Figure 13:
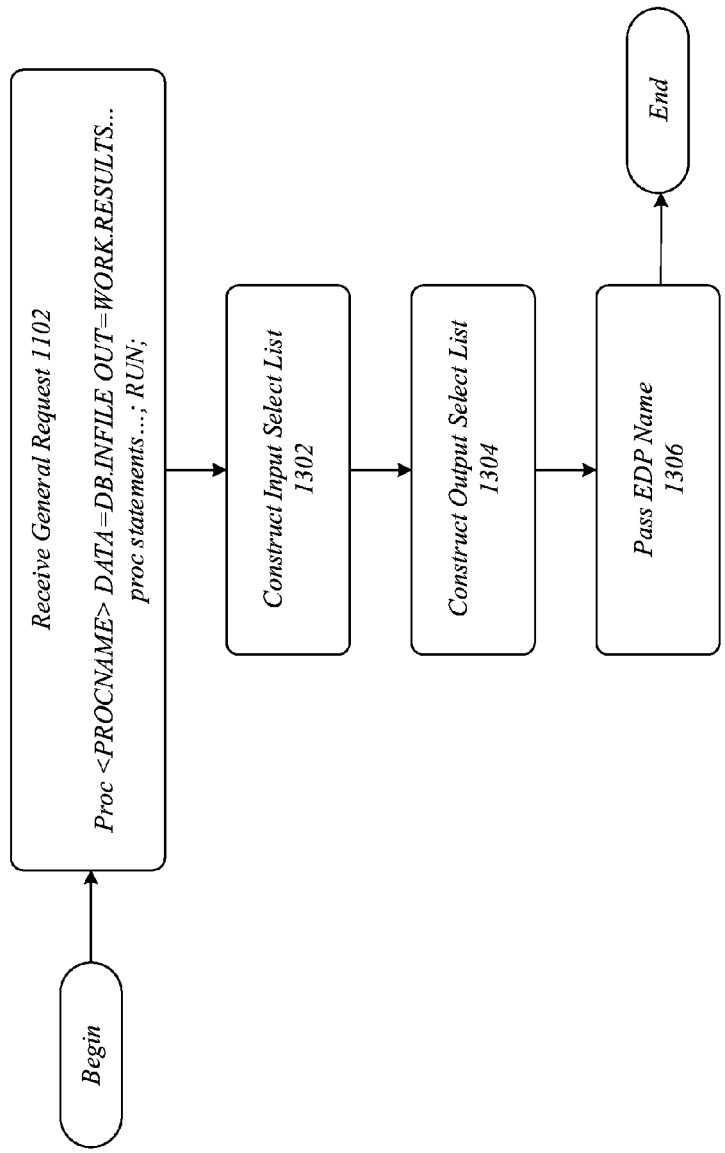
FIG. 13 illustrates an embodiment of a fourth logic flow.

FIG. 13 illustrates one embodiment of a fourth logic flow 1118. The logic flow 1118 may be representative of some or all of the operations executed by one or more embodiments described herein. In the illustrated embodiment shown in FIG. 13, the logic flow 1118 may represent components of the block 1118 of FIG. 11, where the electronic database program is published.

As illustrated, the logic flow 1118 includes the block 1102 where a general request is received. The logic flow then proceeds to block 1302 where an input select list is constructed. In one example, the input select list may be constructed on the basis of a DATA=, WHERE clause, and the proc statements.

In various embodiments, a general request may describe an input select in one of three ways. First, a general request may include a text object containing SQL-like SELECT statement syntax. It can contain specific semantics for table and column names. For example, these may include: #{TBLint}#—table name; #{TALint}#—table alias name; #{ COLint}#—column name; #{ CALint}#—column alias name; and #{ TCRint}#—table.column name. The term "int" refers to a unique integer number to identify a specific object. Second, a general request may include a table object representing the input table. This is converted into a SQL "select * from table" string. Third, a general request may include various defined objects that model an input select. The defined objects may model the SELECT statement with defined objects suitable for placement on: a source list—input table from a procedure DATA=semantic; a select list—input columns made known to the embedded database program 406; a group by list—input to the embedded database program 406 can be grouped; an order by list—input to the embedded database program 406 can be ordered; a where clause—input to the embedded database program 406 can be pre-filtered; and a having clause—input to the embedded database program 406 can be post-filtered.

The logic flow then proceeds to block 1304 where an output select list is constructed. The output select list may be constructed based on a program output, such as a DS2 program output, for an embedded program that is to perform the analytical calculation specified in the general request. In some cases, the output columns of an output select list of a DS2 program can differ in number, by name, and by type from the input select, depending on the analytic calculation.

In one embodiment, a general request may describe an output select using various defined objects. The defined objects may model the SELECT statement with defined objects suitable for placement on: a select list—output columns projected back from the embedded database program 406; a group by list—results from the embedded database program 406 can be grouped; an order by list—results from the embedded database program 406 can be ordered; a where clause—results from the embedded database program 406 can be pre-filtered; and a having clause—results from the embedded database program 406 can be post-filtered.

The logic flow then proceeds to block 1306, where the embedded database program name is passed. For example, in DS2 programs, every published DS2 program is named. The program name associated with the desired analytical calculation may be passed to an SQL-based compute request in one example.

FIG. 14 illustrates one embodiment of a fifth logic flow 1400. The logic flow 1400 may be representative of some or all of the operations executed by one or more embodiments described herein.

In the illustrated embodiment shown in FIG. 14, the logic flow 1400 includes a block 1402, in which a compute request is received to perform an analytical calculation on data stored in a distributed database system comprising a control node and multiple worker nodes, where the compute request received is received from a client application using a threaded kernel service layer. In one example, one or more worker nodes 304-a of distributed database system 140 may each receive a compute sub-request 502-b generated from a compute request 130 sent by the client device 102, where the client device 102 employs the threaded kernel service layer 121.

The logic flow then proceeds to block 1404. At the block 1404, an embedded process is executed in an analytic container on a node of the distributed database system, where the embedded process comprises a threaded kernel service layer matching the threaded kernel service layer used by the client application. For example, a node 302 may include an analytic container 400 that executes the embedded process 404, where the embedded process includes a threaded kernel service layer 421 that matches the threaded kernel service layer 121 used by the client application 120 that generated the compute request 130 to be executed by the analytic container 400.

The logic flow then proceeds to block 1406. At the block 1406, an embedded database program 406 is executed by the embedded process 404 on a worker node 304-a using the threaded kernel service layer 421, where the embedded database program 406 is arranged to perform the analytical calculation. For example, the embedded database program 406 of analytical container 400 may be executed and may employ the same threaded kernel service layer 421 as the threaded kernel service layer 121 contained in client application 120 to perform an analytical calculation.

The logic flow then moves to block 1408 where an analytical calculation is performed on a partition of data local to the node using the embedded database program to form a result set. In one example, in the distributed database system 140, each worker node 304-1, 304-2 may receive a respective compute sub-request 502-1, 502-2-1. Each worker node 304-a may then retrieve a set of data local to the respective worker node 304-a, where the local data is to be processed by each worker node 304-a by executing the same embedded database program 406. The results of the execution in each worker node 304-a may be sent as a respective compute sub-response 602-c that includes a result set.

The logic flow then may proceed to block 1410, where a compute response is sent with the result set to the client application. In one example, the compute sub-responses 602-1, 602-2 generated by respective worker nodes 304-1, 304-2 may be passed to the control node 302, and forwarded as compute response 132 to the client application 120, including the query result set.

Figure 15:
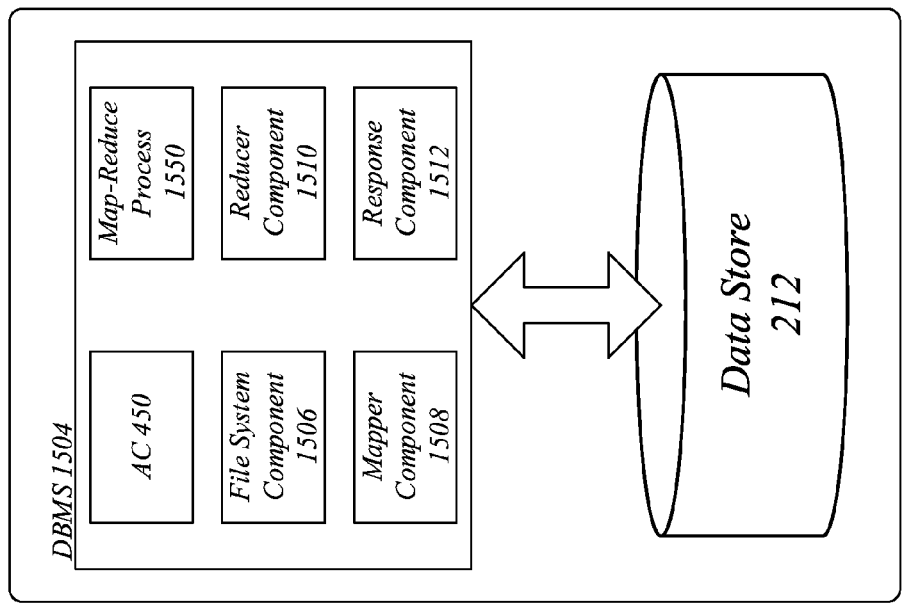
FIG. 15 illustrates an embodiment of a second database component.

FIG. 15 illustrates an embodiment of a database node 1502. In various embodiments, database node 1502 may be similar to database node 202 illustrated in FIG. 2. The exemplary database node 1502 may form part of a distributed database system, such as the distributed database system 140. As shown in FIG. 15, the database node 1502 may include a database management system (DBMS) 1504 further including an analytic container 450, a file system component 1506, a mapper component 1508, a map-reduce process 1550, a reducer component 1510 and a response component 1512. As further depicted in FIG. 15, the database management system 1504 may be coupled to a data store 212. In general, the database node 1502 of a distributed database system 140 consistent with the present embodiments may include one or more central processing units (CPU) (not separately shown), which may operate system support software. The node may also include one or more memory storage devices (e.g., storage disks), an example of which is illustrated as data store 212 in FIG. 15.

In various embodiments, the file system component 1506 may be a distributed file system for storing large amounts of information, on the scale of gigabytes, terabytes, or petabytes, over one or more nodes, such as control node 302 and worker nodes 304 of FIG. 3. More specifically, each worker node may include an instance of the DBMS 1504 including the file system component 1506 to store data on the data store 212.

In some embodiments, the information may be read or retrieved from the file system 1506 by a mapper component 1508 on one or more nodes. The mapper component 1508 may retrieve information based on a compute request such as a Hadoop map-reduce request received from a computing device 102 or an application server 152. In addition, the mapper component 1508 may perform a number of tasks on the information retrieved from file system component 1506 including inserting the information into input rows, sorting the information and filtering the information. For example, the mapper component 1508 may sort the information in an ascending or descending order. In another example, the mapper component 1508 may also filter the information based on one or more attributes. The mapper component 1508 may put the information into input rows for processing by an analytic container, such as analytic container 450 of FIG. 4B.

In various embodiments and as previously discussed, the analytic container 450 may receive the information from mapper component 1506 and perform various processing and tasks on the information. Moreover, the analytic container 450 may provide an execution environment to process a compute request. The analytic container 450 may be generally arranged to provide an array of portable services, definitions, data formats, and drivers to support various analytical procedures and programming languages based on a compute request. The analytic component 450 may pass or send the processed information to a reducer component 1510 for post-processing such as generating a compute response or map-reduce response to send to a client device 102 and application server 152. In some embodiments, analytical calculations may be chained together or compute in series such that the output of the reducer component 1510 may be the input of a second or next calculation for the mapper component 1506 to perform a second calculation. This process may be repeated for any number of calculations based on the compute request.

In some embodiments, the DBMS 1504 may also include a map-reduce process 1550 to control various aspects of processing a compute request utilizing the components of the DMBS 1504. For example, the map-reduce process 1550 may receive the compute request and a published embedded database program to perform one or more of the analytical calculations. The map-reduce process may control the processing of the information by utilizing the mapper component to retrieve information from a database based on the compute request and put the information into input rows. The map-reduce process 1550 may also invoke or initiate an embedded process using an embedded java database program to process the information, such as the embedded process 404 and embedded java database program 452 of analytic container 450. The embedded process may also include the embedded database program and a threaded kernel service to perform the analytical calculations on the information. In various embodiments, the embedded process may receive in the information from the mapper component 1508 and may process the information based on the compute request.

The map-reduce process 1550 may instruct the embedded process to send the processed information to the reducer component 1510 to perform post-processing on the information, as previously discussed. Finally, the map-reduce process 1550 may include using the reducer component 1510 to send the post processed information to a response component 1512 to generate a compute response. The response component 1512 may generate the compute response including the processed information and send the compute response to a client device and application server.

Figure 16:
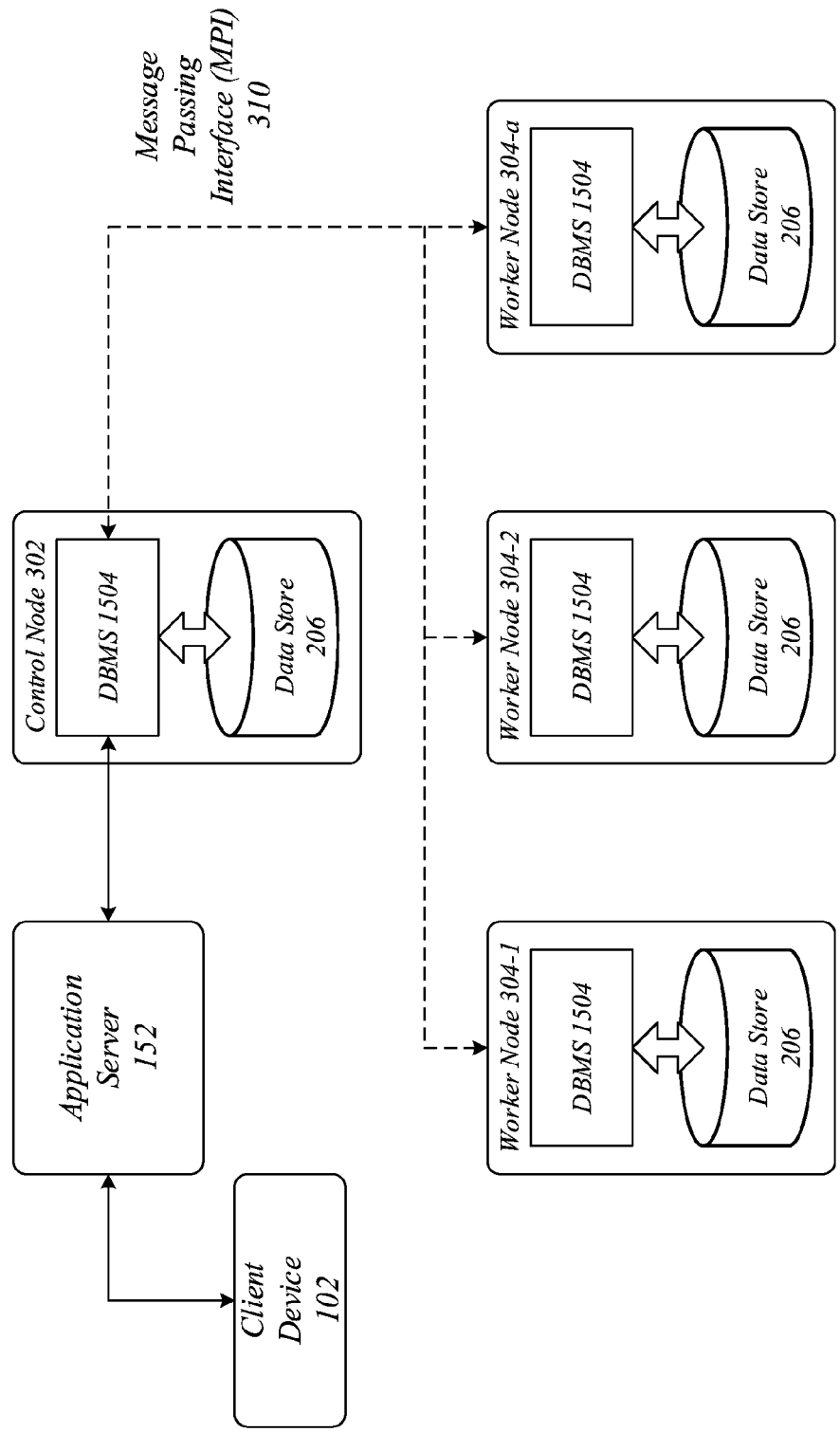
FIG. 16 illustrates another embodiment of a distributed database system.

FIG. 16 illustrates an embodiment of a distributed database system 140 similar to distributed database system 140 of FIG. 3. The distributed database system 140 may be part of a cloud-based computing system and include one or more client devices, such as client device 102 coupled with an application server 152. The client devices may access one or more applications on the application server 152 via an interface or portal such as a web browser. For example, a user of the client device 102 may interact with an application operating on the application server 152 via the web browser. Information may be communicated between the client device 102 and the application server 152 based on one or more inputs and user interactions.

The application server 152 may couple to a central process, or control node 302, which, in turn, is coupled to one or more worker nodes 304. In general, each of the nodes of the distributed database system 140, including the control node 302, and worker nodes 304-1, 304-2, and 304-a, may include the database management system, such as DBMS 1504 of FIG. 15 and data store 206. It is worthy to note that "a" and "b" and "c" and similar designators as used herein are intended to be variables representing any positive integer. In various embodiments, the control node 302 may manage operations in one or more of the worker nodes 304. More particularly, the control node 302 may be arranged to receive and process a compute request from the client 102 when analytic computations are to be performed that require data stored in one or more of the worker nodes 304.

In various embodiments, one or more of the components of distributed database system 140 may be collocated, including the client device 102, application server 152, control node 302, and one or more worker nodes 304. However, more generally, none of the components of distributed database system 140 need be collocated. Moreover, in some embodiments, any one of the nodes of the distributed database system 140 may be arranged to assume the role of the control node. Various embodiments are not limited in this manner.

In various embodiments, in operation a query request received by the control node 302 may be received as a compute request 130 such as a Hadoop map-reduce request, a HiveQL request, a PIG request or any other java request. For example, the application server 152 may generate a general request to perform an analytical calculation, which is processed by the compute model component 122 to construct an in-memory work request to be performed on the distributed database system 140. Subsequently, the compute request component 124 may generate a compute request by translating the basic structures and pseudo information of the general request into a database-specific request, e.g. Hadoop map-reduce request, HiveQL request, or PIG request that can be received by the control node 302 of the distributed database system 140. The compute request may subsequently be transmitted over interface 129 as the compute request 130.

In particular embodiments, the general request generated by the application server 152 may be received with a name for the distributed database system 140 to process the general request. Accordingly, when the distributed database system 140 is designated, the compute request 130 is transmitted to control node 302.

Consistent with the present embodiments, when the control node 302 receives a compute request 130 sent from the application server 152, the control node 302 may unpack the compute request 130, parse the compute request 130, and establish a flow of execution steps to perform an operation such as an analytical calculation using one or more worker nodes 304 of the distributed database system 140.

As illustrated in FIG. 16, the distributed database system 140 may further include a communication protocol such as the message passing interface (MPI) 310 to communicate information between the nodes. Various embodiments are not limited in this manner and the distributed database system 140 may communicate information between the nodes using any protocol. When the control node 302 establishes a flow of execution for a compute request 130, the control node 302 may distribute the execution steps to worker nodes 304-1 to 304-a via the message passing interface 310. Subsequently, results may be returned from one or more worker nodes 304-1 to 304-a to the control node 302 via the message passing interface 310.

In various embodiments, each of multiple worker nodes 304-1 to 304-a may contain a respective partition of data to be processed according to the compute request. The control node 302 may establish an execution flow in which messages are sent to multiple different worker nodes 304-1 to 304-a. Each worker node 304-1 to 304-a may subsequently load and execute a specified compute function for the partition of data contained by that worker node.

When each of the worker nodes 304-1 to 304-a, that receives a message to execute a compute function from control node 302, completes execution of its specified compute function on its partition of data, the worker node 304 may return results to the control node 302 through the message passing interface 310. The results may subsequently be returned from the control node 302 to the application server 152 that generated the compute request.

Although FIG. 16 illustrates a distributed database network 142 that comprises a control node 302 and multiple worker nodes 304-a, more general embodiments include any network in which an interface is provided so that a client device may initiate the execution of a compute request within a group of foreign machines, utilize resources of the foreign machines, including memory, input/output functionality, an so forth. The client device also initiate execution on the foreign machines to load previously installed executable images that can launch threads of execution to perform analytic tasks, and distribute compute requests across the foreign machines.

Figure 17:
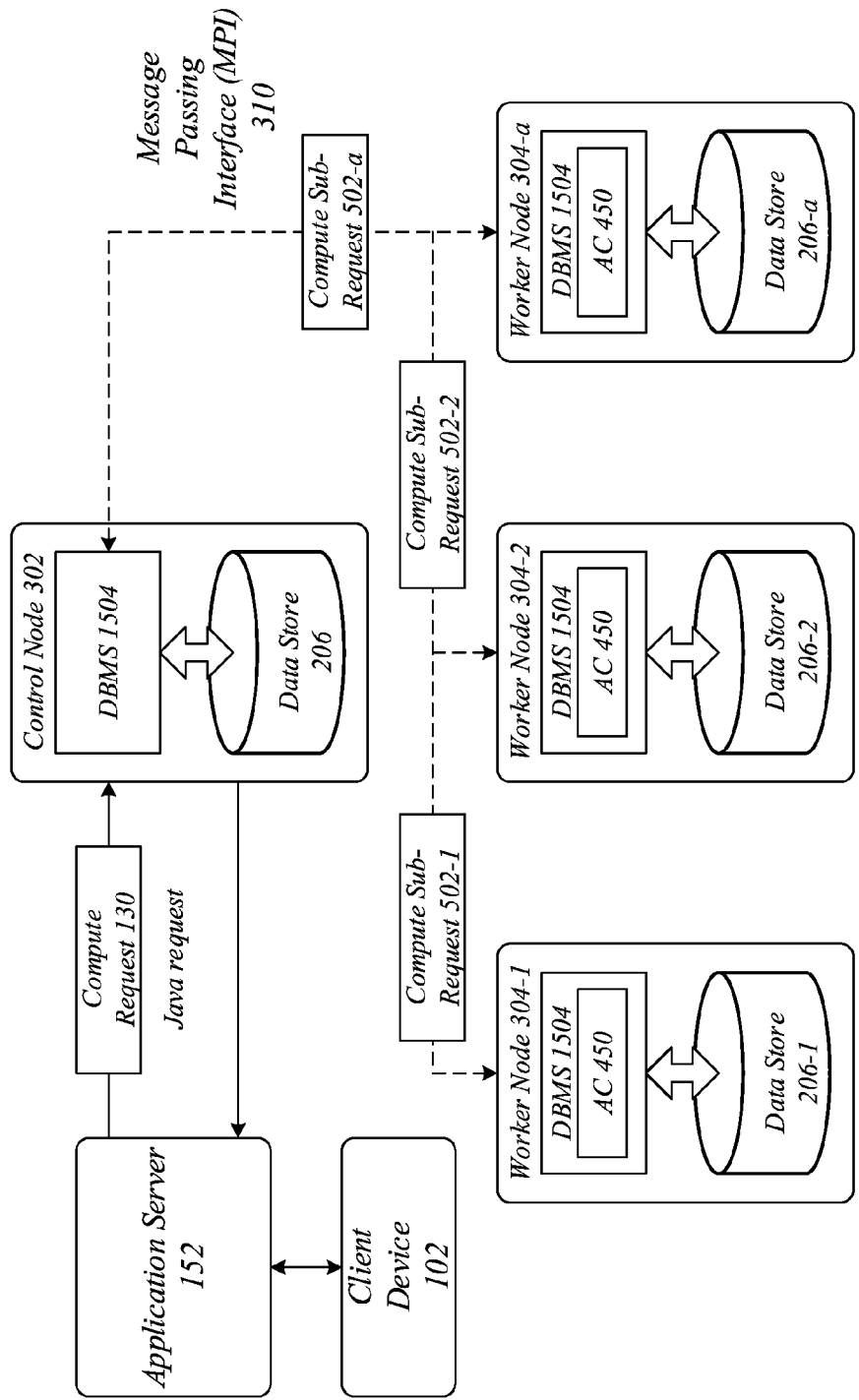
FIG. 17 illustrates another embodiment of a distributed database system.

FIG. 17 illustrates another embodiment of the distributed database system 140 that illustrates operation of the analytic container 450 in a cloud-based computing environment. In particular, FIG. 17 depicts an instance in which multiple worker nodes 304-1 to 304-a execute an analytic calculation in response to a Hadoop map-reduce request, PIG request, HiveQL request or SQL request sent from an application server 152. As illustrated, the application server 152 may generate a compute request 130 that is transmitted to the control node 302 based on information received from a client device 102. The control node 302 may then forward the compute request 130 over the message passing interface 310 as a set of compute sub-requests 502-b to multiple worker nodes of the worker nodes 304-1 to 304-a.

In the example illustrated in FIG. 17, a compute request 130 may be divided into two sub-requests: a compute sub-request 502-1, which is forwarded to the worker node 304-1, and a compute sub-request 502-2, which is forwarded to the worker node 304-2. Each of the different compute sub-requests 502-1, 502-2 may require a different partition of data to be processed. Once each worker node 304-1, 304-2 receives the compute sub-request 502-1, 502-2, respectively, the worker nodes 304-1, 304-2 may each execute its analytic container 450 to perform its analytic calculation. For example, the worker node 304-1 may read a first partition of data from the data store 206-1 to execute an analytic calculation in response to the compute sub-request 502-1. Likewise, the worker node 304-2 may read a second partition of data from the data store 206-2 to execute an analytic calculation in response to the compute sub-request 502-2. In this manner, parallel analytic computations may be performed in the worker nodes 304-1 and worker node 304-2 in response to the original compute request 130.

Moreover, each of the analytic containers 450 may communicate with a mapper component and a reducer component, as previously discussed with respect to FIG. 15. More specifically, the analytic containers 450 may receive information from a mapper component on each of the worker nodes 304-a in rows to perform the analytical calculations on the information. The analytic containers 450 may perform the analytical operations and pass or send the processed information to a reducer component to perform post-processing on the information. For example, the reducer component may post-process the information and generate a compute response. In some embodiments, analytical calculations may be chained together or compute in series such that the output of the reducer component may be the input of a second or next calculation for the mapper component to perform. This process may be repeated for any number of calculations based on the compute request.

Although the illustration in FIG. 17 depicts parallel execution of only two different sub-requests 502-1, 502-2, in various embodiments, any number of different worker nodes 304-a of a distributed database system 140 may process respective compute sub-requests 502-a, where each worker node 304-a processes a different compute sub-request 502-a.

Figure 18:
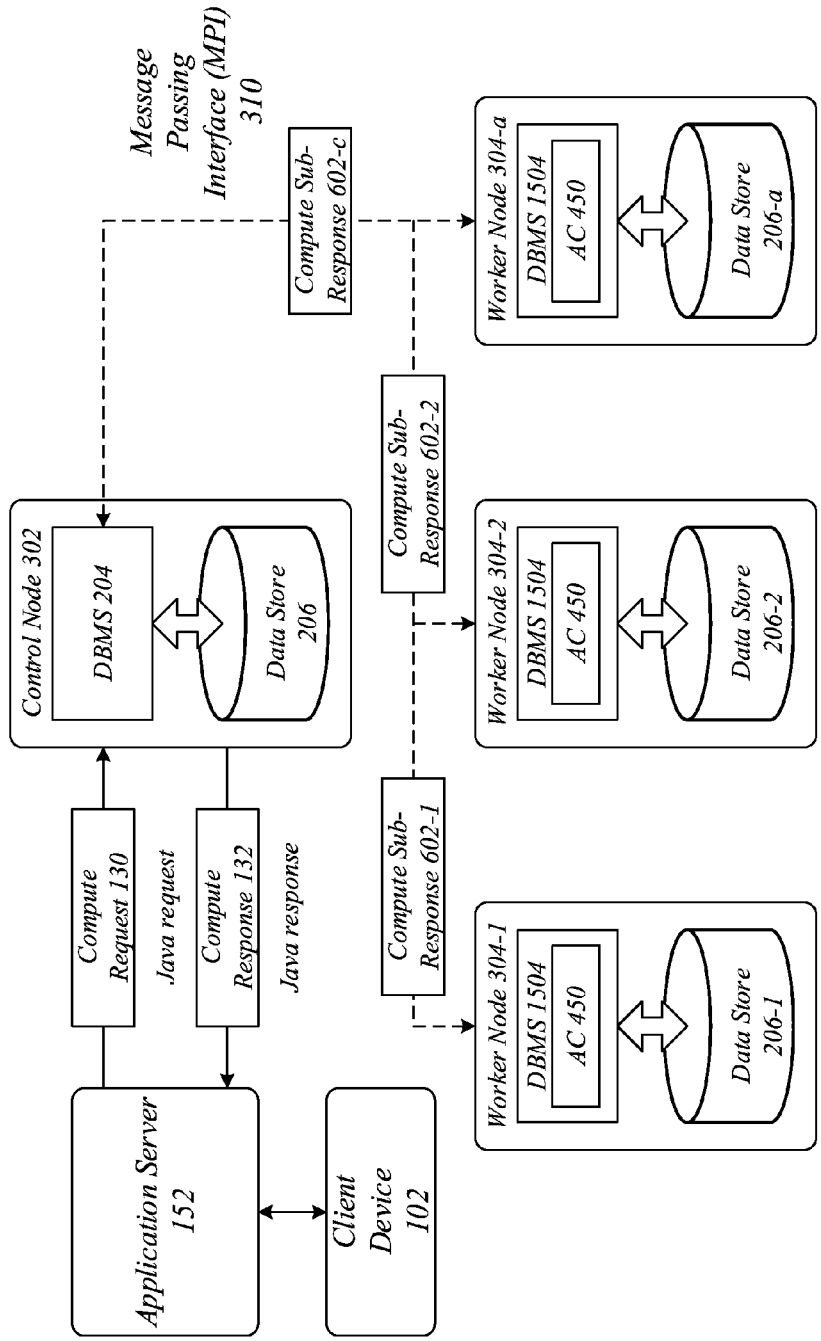
FIG. 18 illustrates another embodiment of a distributed database system.

FIG. 18 depicts further operation of the distributed database system 140. Continuing with the example illustrated in FIG. 17, the particular scenario illustrated in FIG. 18 depicts generation of a compute response 132 by the distributed database system 140, in response to the compute request 130 generated by the application server 152. After each analytic container 450 of a respective worker node 304-1, 304-2 receives a respective compute sub-request 502-1, 502-2, the respective worker node 304-1, 304-2 may each execute the analytic container 450 to perform its individual analytic calculation, and subsequently return the results as a compute sub-response 602-c.

FIG. 18 details an example in which the worker nodes 304-1, 304-2 of the distributed database system 140 generate respective compute sub-responses 602-c, such as compute sub-responses 602-1, 602-2 generated by the worker nodes 304-1, 304-2, respectively. The compute sub-responses 602-1, 602-2 may be generated by the analytic container 450 or a reducer component and may be forwarded over the message passing interface 310 to the control node 302, which assembles the compute sub-responses 602-c to generate a compute response 132 to be sent to the application server 152.

Although the illustration in FIGS. 17 and 18 depict parallel execution of only two different sub-requests 502-1, 502-2, and generation of two compute sub-responses 602-1, 602-2, respectively, it may be appreciated that any number of different worker nodes 304-a of a distributed database system 140 may process respective sub-requests, where each worker node 304-a processes a different sub-request and generates a concomitant sub-response.

As further illustrated in FIG. 18, the compute response 132 may form a result set that is received by the application server 152 that generated the compute request 130. Referring also to FIG. 1B, when the compute response 132 is received by the application server 152 the compute response component 126 may place the compute response 132 into a group of in-memory structures to form a result set that is suitable for consumption by the application server 152. If the compute response 132 is in a format native to the worker nodes 304, the compute response component 126 may then repackage the compute response 132 as a result set in the format of the client application 120 of application server 152. Subsequently, the application server 152 may employ the interface of the result set component 126 to access the data of the compute response.

FIG. 19 illustrates one embodiment of a logic flow 1900. In various embodiments, logic flow 1900 may be representative of a logic flow performed by the map-reduce process of FIG. 15.

In the illustrated embodiment shown in FIG. 19, the logic flow 1900 may include retrieving information from a database file system based on a compute request block 1902. In some embodiments, a worker node of a distributed data base system may receive a sub-compute request based on a compute request received from an application server by a client node. As previously discussed, an application server may generate a database specific request, such as a Hadoop map-reduce request, PIG request, or HiveQL request for a distributed database system to process information based on one or more inputs received from a client application operating in a cloud-base compute environment.

In various embodiments, a map-reduce process utilizing a mapper component may parse the request or sub-request and retrieve information or data from a data store of the database file system. Further, at block 1904, the logic flow 1900 may include inserting information into input rows for processing. For example, the mapper component may insert the information into input rows in the order the information is retrieved from the database file system. In some embodiments, the mapper component may sort the information and filter the information based on the sub-compute request and then be put into input rows for processing by the analytic container including the embedded process.

In some embodiments, the logic flow 1900 may include the map-reduce process causing the execution of an embedded process and processing the information in the input rows at block 1906. For example, the embedded process may be invoked or executed by an embedded process java component on the worker node of the distributed database system, the embedded process including a threaded kernel service layer. More specifically, the map-reduce process may process and parse a compute request to invoke the embedded process and threaded kernel service layer utilizing the embedded process java component. In some embodiments, the map-reduce process may also receive a published embedded database program and may utilize the embedded database program to perform the analytical calculation.

At block 1908, the logic flow 1900 may include post-processing the information. More specifically, a result set may be finalized by the map-reduce process utilizing a reducer component, as previously discussed above, and a compute response may be generated including the result set. The logic flow 1900 may then send a compute response including the result set to an application server, at block 1910. In some embodiments, the compute response may be a sub-compute response and may be sent to a control node. The control node may receive one or more result sets from any number of sub-compute responses and may generate a compute response from all result sets to send back to an application server.

FIG. 20 illustrates one embodiment of a logic flow 2000. The logic flow 2000 may be representative of some or all of the operations executed by one or more embodiments described herein.

In the illustrated embodiment shown in FIG. 20, the logic flow 2000 may include generating, by a processor circuit, a general request having structures and information to perform an analytical calculation on data stored in a distributed database system, the general request generated by a client application at block 2002. Further, the logic flow 2000, at block 2004, may convert the structures and information of the general request to a compute request having a request format conforming to a query language used by the distributed database system.

In some embodiments, the logic flow 2000 includes sending the compute request to a node of the distributed database system at block 2006. For example, an application server may include an interface coupled with a distributed database system and may send the compute request to the distributed database system via the interface.

Further, at block 2008 the logic flow 200 may receive a compute response from the node of the distributed database system, the compute response including a result set of the analytical calculation performed on data local to the node from an analytic container implemented by the node, the analytic container including an embedded process to replicate an execution environment hosted within the distributed database system used by the client application.

Figure 21:
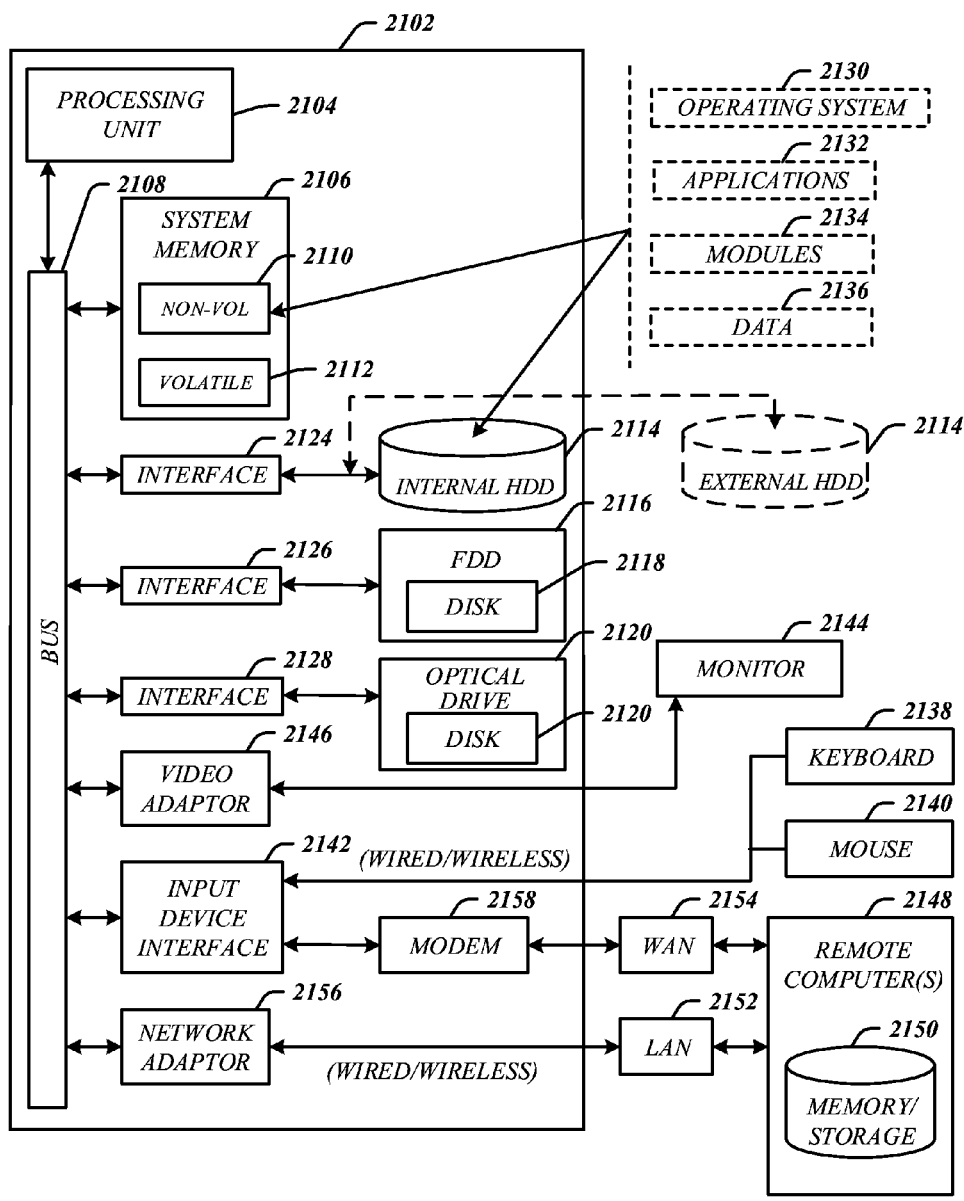
FIG. 21 illustrates an embodiment of a computing architecture.

FIG. 21 illustrates an embodiment of an exemplary computing architecture 2100 suitable for implementing various embodiments as previously described. In one embodiment, the computing architecture 2100 may comprise or be implemented as part of an electronic device.

As used in this application, the terms "system" and "component" are intended to refer to a computer-related entity, either hardware, a combination of hardware and software, software, or software in execution, examples of which are provided by the exemplary computing architecture 2100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2100.

As shown in FIG. 21, the computing architecture 2100 comprises a processing unit 2104, a system memory 2106 and a system bus 2108. The processing unit 2104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2104.

The system bus 1108 provides an interface for system components including, but not limited to, the system memory 2106 to the processing unit 2104. The system bus 2108 can be any of several types of bus structure that may further interconnect to a memory bus (with or without a memory controller), a peripheral bus, and a local bus using any of a variety of commercially available bus architectures. Interface adapters may connect to the system bus 2108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 21, the system memory 2106 can include non-volatile memory 2110 and/or volatile memory 2112. A basic input/output system (BIOS) can be stored in the non-volatile memory 2110.

The computer 2102 may include various types of computer-readable storage media in the form of one or more lower speed memory units, including an internal (or external) hard disk drive (HDD) 2114, a magnetic floppy disk drive (FDD) 2116 to read from or write to a removable magnetic disk 2118, and an optical disk drive 2120 to read from or write to a removable optical disk 2122 (e.g., a CD-ROM or DVD). The HDD 2114, FDD 2116 and optical disk drive 2120 can be connected to the system bus 2108 by a HDD interface 2124, an FDD interface 2126 and an optical drive interface 2128, respectively. The HDD interface 2124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2110,2112, including an operating system 2130, one or more application programs 2132, other program modules 2134, and program data 2136. In one embodiment, the one or more application programs 2132, other program modules 2134, and program data 2136 can include, for example, the various applications and/or components of the system 100.

A user can enter commands and information into the computer 2102 through one or more wire/wireless input devices, for example, a keyboard 2138 and a pointing device, such as a mouse 2140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2104 through an input device interface 2142 that is coupled to the system bus 2108, but can be connected by other interfaces such as a parallel port, IEEE 1394 serial port, a game port, a USB port, an IR interface, and so forth.

A monitor 2144 or other type of display device is also connected to the system bus 2108 via an interface, such as a video adaptor 2146. The monitor 2144 may be internal or external to the computer 2102. In addition to the monitor 2144, a computer typically includes other peripheral output devices, such as speakers, printers, and so forth.

The computer 2102 may operate in a networked environment using logical connections via wire and/or wireless communications to one or more remote computers, such as a remote computer 2148. The remote computer 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wire/wireless connectivity to a local area network (LAN) 2152 and/or larger networks, for example, a wide area network (WAN) 2154. Such LAN and WAN networking environments are commonplace in offices and companies, and facilitate enterprise-wide computer networks, such as intranets, all of which may connect to a global communications network, for example, the Internet.

When used in a LAN networking environment, the computer 2102 is connected to the LAN 2152 through a wire and/or wireless communication network interface or adaptor 2156. The adaptor 2156 can facilitate wire and/or wireless communications to the LAN 2152, which may also include a wireless access point disposed thereon for communicating with the wireless functionality of the adaptor 2156.

When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wire and/or wireless device, connects to the system bus 2108 via the input device interface 2142. In a networked environment, program modules depicted relative to the computer 2102, or portions thereof, can be stored in the remote memory/storage device 2150. It will be appreciated that the network connections shown are exemplary and other means of establishing a communications link between the computers can be used.

The computer 2102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 22:
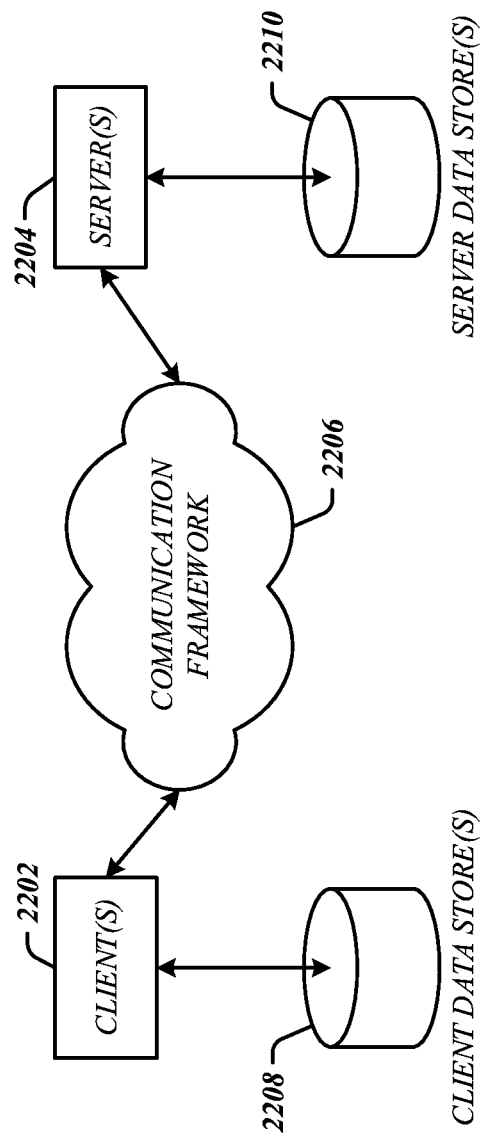
FIG. 22 illustrates an embodiment of a communications architecture.

FIG. 22 illustrates a block diagram of an exemplary communications architecture 2200 suitable for implementing various embodiments as previously described. The communications architecture 2200 includes various common communications elements, such as a transmitter, receiver, transceiver, radio, network interface, baseband processor, antenna, amplifiers, filters, power supplies, and so forth. The embodiments, however, are not limited to implementation by the communications architecture 2200.

As shown in FIG. 22, the communications architecture 2200 comprises includes one or more clients 2202 and servers 2204. The clients 2202 may implement the client devices and servers 2204 may implement the service devices, as previously discussed. The clients 2202 and the servers 2204 are operatively connected to one or more respective client data stores 2208 and server data stores 2210 that can be employed to store information local to the respective clients 2202 and servers 2204, such as cookies and/or associated contextual information.

The clients 2202 and the servers 2204 may communicate information between each other using a communication framework 2206. The communications framework 2206 may implement any well-known communications techniques and protocols. The communications framework 2206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2202 and the servers 2204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    generating, by a processor circuit, a general request having a format conforming to a query language native to a client application and having structures and information to perform an analytical calculation on data, the general request generated by the client application;
    determining whether the general request identifies a distributed database system to perform the analytical calculation on the data;
    determining whether the distributed database system includes an embedded process to perform an in-database analytic calculation according to the general request; and
    when the general request identifies the distributed database system and the distributed database system includes the embedded process,
        converting the structures and information of the general request to a compute request having a request format different than the format native to the client application, the request format conforming to a query language used to manage information by the distributed database system,
        sending the compute request to a node of the distributed database system, and
        receiving a compute response from the node of the distributed database system, the compute response including a result set of the analytical calculation performed on data local to the node from an analytic container implemented by the node, the analytic container including an embedded process to replicate an execution environment hosted within the distributed database system used by the client application.

2. The computer-implemented method of claim 1, comprising publishing an embedded database program arranged to use a threaded kernel service layer to the analytic container.

3. The computer-implemented method of claim 1, wherein the compute request causes a map-reduce process utilizing a mapper component to retrieve the data from a data store of the database file system and put the data into input rows for processing by the embedded process.

4. The computer-implemented method of claim 1, wherein the compute request causes a map-reduce process utilizing an embedded java component to execute the embedded process.

5. The computer-implemented method of claim 1, wherein the compute request causes a map-reduce process utilizing the embedded process to process data from a data store and generate the compute response including the result set.

6. The computer-implemented method of claim 1, wherein the compute request is sent to the node via one or more web service calls.

7. The computer-implemented method of claim 1, wherein the compute request is a Hadoop map-reduce request and the compute response is a Hadoop map-reduce response.

8. The computer-implemented method of claim 1, wherein the compute request is sent to the node via a Hadoop java interface of the distributed database system and the compute response is received from the node via the Hadoop java interface.

9. The computer-implemented method of claim 1, comprising receiving information from a client device to initiate the analytical calculation on data stored in the distributed database system.

10. The computer-implemented method of claim 9, wherein the process circuit is part of an application server in a cloud-based computing architecture and the information is received from the client device via one or more network connections.

11. The computer-implemented method of claim 1, the analytic container including the embedded process to:
process the compute request by interpreting the query language, structures and information from the client application, and
perform the analytical calculation in-database on the node.

12. At least one computer-readable storage medium comprising instructions that, when executed, cause a system to:
generate a general request having a format conforming to a query language native to a client application and having structures and information to perform an analytical calculation on data, the general request generated by the client application;
determine whether the general request points to a distributed database system to perform the analytical calculation on the data;
determine whether the distributed database system includes an embedded process to perform an in-database analytic calculation according to the general request; and
when the general request points to the distributed database system and the distributed database system includes the embedded process, the system to:
convert the structures and information of the general request to a compute request having a request format different than the format native to the client application, the request format conforming to a query language used to manage information by the distributed database system,
send the compute request to a node of the distributed database system, and
receive a compute response from the node of the distributed database system, the compute response including a result set of the analytical calculation performed on data local to the node from an analytic container implemented by the node, the analytic container including an embedded process to replicate an execution environment hosted within the distributed database system used by the client application.

13. The computer-readable storage medium of claim 12, comprising instructions that when executed cause the system to publish an embedded database program arranged to use a threaded kernel service layer to the analytic container.

14. The computer-readable storage medium of claim 12, wherein the compute request causes a map-reduce process utilizing a mapper component to retrieve the data from a data store of the database file system and put the data into input rows for processing by the embedded process.

15. The computer-readable storage medium of claim 12, wherein the compute request causes a map-reduce process utilizing an embedded java component to execute the embedded process.

16. The computer-readable storage medium of claim 12, wherein the compute request causes a map-reduce process utilizing the embedded process to process data from a data store and generate the compute response including the result set.

17. The computer-readable storage medium of claim 12, wherein the compute request is sent to the node via one or more web service calls.

18. The computer-readable storage medium of claim 12, wherein the compute request is a Hadoop map-reduce request and the compute response is a Hadoop map-reduce response.

19. The computer-readable storage medium of claim 12, wherein the compute request is sent to the node via a Hadoop java interface of the distributed database system and the compute response is received from the node via the Hadoop java interface.

20. The computer-readable storage medium of claim 12, comprising instructions that when executed cause the system to receive information from a client device to initiate the analytical calculation on data stored in the distributed database system.

21. The computer-readable storage medium of claim 20, wherein the system is part of a cloud-based computing architecture and the information is received from the client device via one or more network connections.

22. The computer-readable storage medium of claim 12, the analytic container including the embedded process to:
process the compute request by interpreting the query language, structures, and information from the client application, and
perform the analytical calculation in-database on the node.

23. An apparatus, comprising:
a processor circuit;
a network interface coupled with the processor circuit;
a client application operative on the processor circuit to:
generate a general request having a format conforming to a query language native to the client application and having structures and information to perform an analytical calculation on data stored,
determine whether the general request refers to a distributed database system to perform the analytical calculation on the data,
determine whether the distributed database system includes an embedded process to perform an in-database analytic calculation according to the general request, and
when the general request refers to the distributed database system and the distributed database system includes the embedded process;
a compute model component operative on the processor circuit to convert the structures and information of the general request to a compute request having a request format different than the format native to the client application, the request format conforming to a query language used to manage information by the distributed database system;
a compute request component operative on the processor circuit to send the compute request to a node of the distributed database system; and
a compute response component operative on the processor circuit to receive a compute response from the node of the distributed database system, the compute response including a result set of the analytical calculation performed on data local to the node from an analytic container implemented by the node, the analytic container including an embedded process to replicate an execution environment hosted within the distributed database system used by the client application.

24. The apparatus of claim 23, the compute request component to publish an embedded database program arranged to use a threaded kernel service layer to the analytic container.

25. The apparatus of claim 23, wherein the compute request causes a map-reduce process utilizing a mapper component to retrieve the data from a data store of the database file system and put the data into input rows for processing by the embedded process.

26. The apparatus of claim 23, wherein the compute request causes a map-reduce process utilizing an embedded java component to execute the embedded process.

27. The apparatus of claim 23, wherein the compute request causes a map-reduce process utilizing the embedded process to process data from a data store and generate the compute response including the result set.

28. The apparatus of claim 23, wherein the compute request is sent to the node via one or more web service calls.

29. The apparatus of claim 23, wherein the compute request is a Hadoop map-reduce request and the compute response is a Hadoop map-reduce response.

30. The apparatus of claim 23, wherein the compute request is sent to the node via a Hadoop java interface of the distributed database system and the compute response is received from the node via the Hadoop java interface.

31. The apparatus of claim 23, the client application to receive information from a client device to initiate the analytical calculation on data stored in the distributed database system.

32. The apparatus of claim 31, wherein the client application is part of an application server in a cloud-based computing architecture and the information is received from the client device via one or more network connections.

33. The apparatus of claim 23, the analytic container including the embedded process to:
   process the compute request by interpreting the query language, structures, and information from the client application, and
   perform the analytical calculation in-database on the node.

* * * * *